(12) United States Patent
Wang et al.

(10) Patent No.: US 12,418,206 B2
(45) Date of Patent: Sep. 16, 2025

(54) STATOR CORE, MOTOR, POWER ASSEMBLY, AUTOMOBILE AND VEHICLE

(71) Applicant: WUXI INFIMOTION TECHNOLOGY CO., LTD., Jiangsu (CN)

(72) Inventors: Yin Wang, Ningbo (CN); Zhanglu Xu, Ningbo (CN); Zhen Wang, Ningbo (CN); Liang Fang, Ningbo (CN); Tao Han, Ningbo (CN); Yanjun Tan, Ningbo (CN); Xiaozhe Lin, Ningbo (CN); Ruiping Wang, Ningbo (CN); Ingo Scholten, Ningbo (CN)

(73) Assignee: WUXI INFIMOTION TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/908,242

(22) PCT Filed: Feb. 25, 2022

(86) PCT No.: PCT/CN2022/078079
§ 371 (c)(1),
(2) Date: Aug. 31, 2022

(87) PCT Pub. No.: WO2022/257507
PCT Pub. Date: Dec. 15, 2022

(65) Prior Publication Data
US 2024/0223032 A1 Jul. 4, 2024

(30) Foreign Application Priority Data

Jun. 9, 2021 (CN) .......................... 202121285519.0
Dec. 30, 2021 (CN) .......................... 202111657979.6

(51) Int. Cl.
*H02K 1/20* (2006.01)
*H02K 3/24* (2006.01)

(52) U.S. Cl.
CPC ................. *H02K 1/20* (2013.01); *H02K 3/24* (2013.01)

(58) Field of Classification Search
CPC .. H02K 1/20; H02K 3/24; H02K 9/19; H02K 5/203
(Continued)

(56) References Cited

U.S. PATENT DOCUMENTS 5,491,371 A * 2/1996 Ooi ........................ H02K 1/32
  310/58
10,230,287 B2 * 3/2019 Sever .................... H02K 5/203
(Continued)

FOREIGN PATENT DOCUMENTS

AU  2014241468 B2  12/2016
CN  101232211 A   7/2008
(Continued)

OTHER PUBLICATIONS

Translation for WO-2014032876-A2 (Year: 2014).*
(Continued)

*Primary Examiner* — Terrance L Kenerly
*Assistant Examiner* — Theodore L Perkins

(57) ABSTRACT

A stator core, a motor, a power assembly, an automobile and a vehicle are provided. The motor includes: a casing; a stator core fixed in the casing, and a slit flow channel is formed between an outer side wall of the stator core and an inner side wall of the casing, and the slit flow channel is provided as a network-shaped cooling flow channel for cooling fluid to flow; a stator winding mounted on the stator core; and a rotor rotatably sleeved on an inner side of the stator core. A flow path of the cooling fluid in the network-shaped cooling (Continued)

channel is also network-shaped, and a flow form of the cooling fluid in the network-shaped path is turbulent.

15 Claims, 22 Drawing Sheets

(58) Field of Classification Search
USPC .......................................................... 310/64
See application file for complete search history.

(56) References Cited

U.S. PATENT DOCUMENTS

| | | | | |
|---|---|---|---|---|
| 2008/0100159 | A1* | 5/2008 | Dawsey | H02K 1/20 310/59 |
| 2010/0320851 | A1* | 12/2010 | Lambka | H02K 9/19 310/54 |
| 2013/0278092 | A1 | 10/2013 | Coldwate et al. | |
| 2016/0294231 | A1* | 10/2016 | Andres | H02K 5/18 |
| 2018/0191218 | A1* | 7/2018 | Lee | H02K 1/20 |
| 2018/0358849 | A1* | 12/2018 | Saint-Michel | H02K 7/14 |
| 2019/0157922 | A1 | 5/2019 | Tangudu et al. | |
| 2020/0161938 | A1* | 5/2020 | Fatemi | H02K 9/197 |

FOREIGN PATENT DOCUMENTS

| | | |
|---|---|---|
| CN | 101790831 A | 7/2010 |
| CN | 110492663 A | 11/2019 |
| CN | 111030358 A | 4/2020 |
| CN | 112104115 A | 12/2020 |
| CN | 215733714 U | 2/2022 |
| DE | 102012017293 A1 | 2/2014 |
| JP | 2008109851 A | 5/2008 |
| JP | 2020137269 A | 8/2020 |
| WO | WO-2014032876 A2 * | 3/2014 ............... H02K 1/20 |
| WO | 2018173877 A1 | 9/2018 |

OTHER PUBLICATIONS

Office Action dated Dec. 6, 2023 for KR Patent Application No. 10-2022-7031386 and English Translation.
Office Action dated Feb. 21, 2024 for Chinese Patent Application No. 202111657979.6 and English Translation.
European Search Report dated Jul. 12, 2023 for European Patent Application No. 22737362.8.
Office Action dated Aug. 22, 2023 for Japanese Patent Application No. 2022-548447 and English Translation.
Office Action dated Nov. 23, 2022 for Chinese Patent Application No. 202111657979.6 and English Translation.
Office Action dated Jul. 1, 2023 for Chinese Patent Application No. 202111657979.6 and English Translation.
International Search Report for PCT/CN2022/078079 Mailed May 19, 2022.

* cited by examiner

STATOR CORE, MOTOR, POWER ASSEMBLY, AUTOMOBILE AND VEHICLE

CROSS-REFERENCE TO RELATED APPLICATIONS

The present application is a U.S. National Phase Entry of International Application PCT/CN2022/078079 having an international filing date of Feb. 25, 2022, which claims priority of Chinese Patent Application No. 202111657979.6, filed to the CNIPA on Dec. 30, 2021, and priority of Chinese Patent Application No. 202121285519.0, filed to the CNIPA on Jun. 9, 2021, the contents disclosed in the above-mentioned applications are hereby incorporated as a part of this application.

TECHNICAL FIELD

The present application relates to, but is not limited to, vehicle technology, and in particular a stator core, a motor, a power assembly, an automobile, and a vehicle.

BACKGROUND

With improvement of power requirements of electric vehicles, torque density and power density of a power assembly, as one of the core components of power output of an electric vehicle, also increase, so as to realize lightweight and miniaturization of a motor. As a core component of power assembly, a motor is the key of power output of the power assembly, which directly determines the power output of the power assembly and power performance of the whole vehicle.

At present, there are usually two methods for improving torque density and power density of motors in the market. The first method is to choose high-performance ferromagnetic materials. The second method is to increase heat dissipation capacity of the motor to protect electronic components and insulating materials. According to different cooling media, the existing cooling technologies for automobile motors may be divided into natural cooling, air cooling, water cooling and oil cooling. The heat dissipation technologies have their own advantages and disadvantages, but how to further improve the heat dissipation capacity of the motor is a direction and a research hotspot on which those skilled in the art are working.

SUMMARY

The following is a summary of subject matters described in detail herein. This summary is not intended to limit the protection scope of the claims.

A motor includes: a casing; a stator core fixed in the casing, and a slit flow channel is formed between an outer side wall of the stator core and an inner side wall of the casing, and the slit flow channel is provided as a network-shaped cooling flow channel for a cooling fluid to flow; a stator winding mounted on the stator core; and a rotor rotatably sleeved on an inner side of the stator core.

A stator core, wherein an outer side wall of the stator core is provided with multiple heat dissipation protrusions, and the multiple heat dissipation protrusions are staggeredly arranged in a network-shaped form.

A power assembly, including the motor as described in any of the above embodiments.

An automobile, including the power assembly as described in the above embodiment.

A motor includes: a stator core and a housing; the stator core is formed by mutually staggeredly stacking multiple annular core punching sheets; wherein the core punching sheets include a first core punching sheet and a second core punching sheet, and the stator core is formed by mutually staggeredly stacking the first core punching sheet and the second core punching sheet; the housing is wrapped around an outer periphery of the stator core and the housing and the outer periphery of the stator core are mutually fitted to form a flow channel; structures of the first core punching sheet and the second core punching sheet at the outer peripheral surfaces are different so that the flow channel extends across the outer peripheral surfaces of the first core punching sheet and the second core punching sheet, thereby enabling the liquid to flow in series between the first and second core punching sheets and the housing.

A motor includes: a stator core and a housing; the stator core is formed by mutually staggeredly stacking multiple annular core punching sheets; wherein an outer periphery of each core punching sheet is provided with multiple convex parts and multiple concave parts, the housing is wrapped around the outer periphery of the stator core, and the housing and the convex parts of the stator core are mutually fitted to form a flow channel; wherein a circumferential dimension of the convex part is smaller than a circumferential dimension of the concave part, and when the core punching sheets are mutually staggeredly stacked, the convex parts and the concave parts of two adjacent core punching sheets are staggeredly provided, enabling liquid to flow in series in the multiple core punching sheets.

A vehicle, including the motor described above.

Other aspects will become apparent upon reading and understanding of the drawings and detailed description.

DETAILED DESCRIPTION

At present, most of power conversion devices of new energy vehicles rely on motors for energy conversion. Electrical energy is converted into mechanical energy or mechanical energy is converted into electrical energy. Therefore, its advanced technology plays an important role in development of automobiles. In limited space of an automobile, size and weight of a motor affect power performance, cost and vehicle type. Especially, a volume size of the motor is the most sensitive.

According to the different cooling media, the existing cooling technologies for automobile motors may be divided into natural cooling, air cooling, water cooling and oil cooling, wherein the oil cooling has the highest heat exchange efficiency, and at present, most cooling schemes for automobile motors adopt oil cooling. The oil cooling system improves heat dissipation capacity of the motor and protects insulating materials. With the same power, the volume size of a motor with oil cooling can be smaller, such a motor is convenient to be arranged and carried by the whole vehicle, and costs can also be reduced.

Herein, oil cooling for a stator is performed by manners such as sprinkling oil on a surface and passing oil inside the stator core. These manners have limited heat dissipation area and average heat dissipation performance. The cooling effect is the preferred in a case that multiple axial oil grooves are formed on an outer side wall of a stator core and a cooling liquid is sprayed on an end winding of the stator after cooling the stator core. An advantage of such method is that of the multiple oil grooves is formed in an axial direction of the stator core, so that the heat dissipation area of the stator core is greatly increased.

The motor according to the embodiment of the present application further taps the potential of the motor with oil cooling thus a more effective cooling mechanism is designed.

In the cooling technologies for machine motor, since the cooling efficiency of oil is higher than that of other cooling media, in the embodiment of the present application, the cooling fluid and a liquid entering a flow channel (i.e., a slit flow channel) refer to the cooling oil. It may be understood that the cooling fluid is not limited to the cooling oil, but may also be other cooling media with insulating characteristics.

Principles and features of the embodiments of the present application are described below with reference to the accompanying drawings, while the examples given are intended to explain the embodiments of the present application only and are not intended to limit the scope of the present application.

Figure 1:
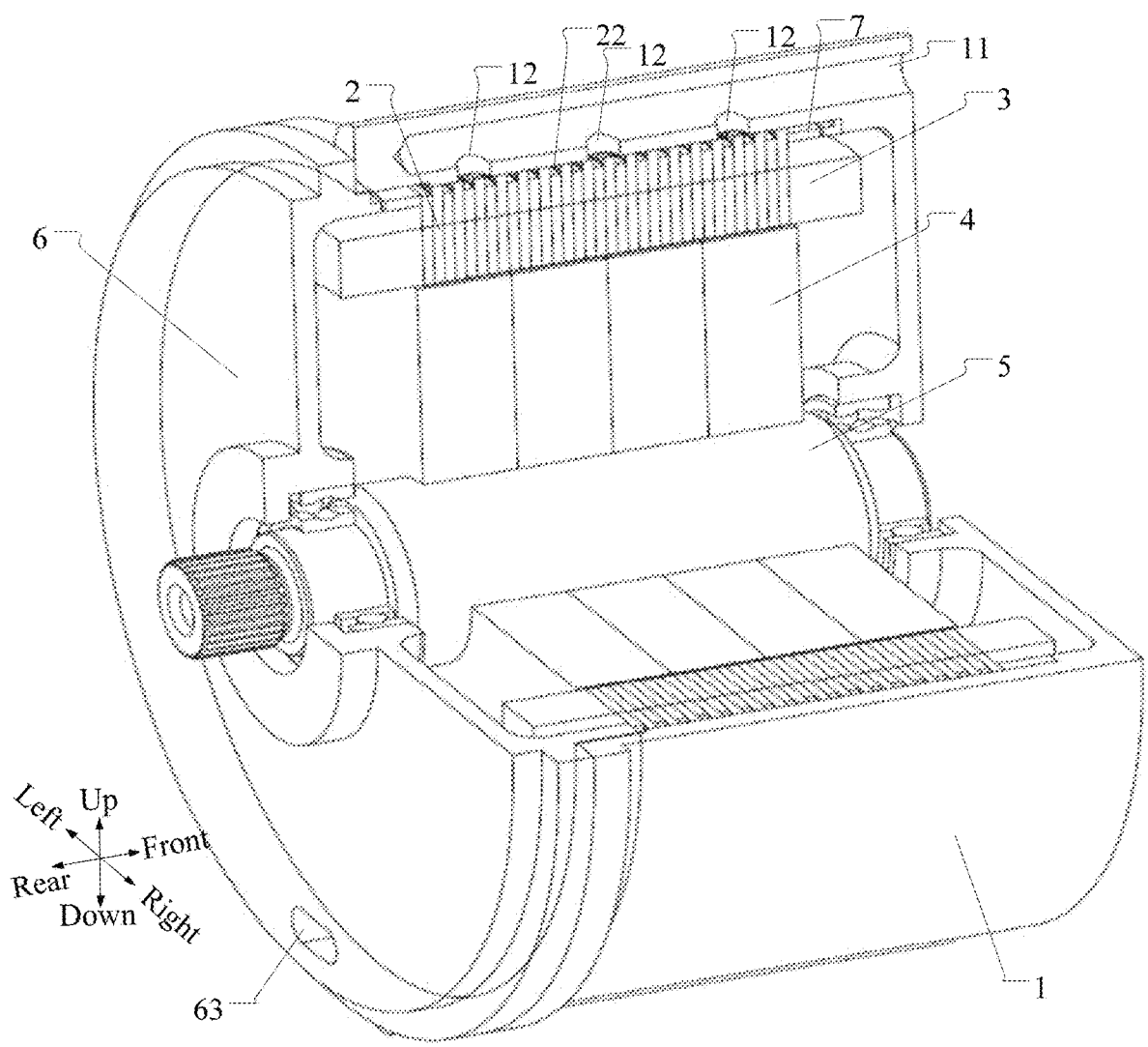
FIG. 1 is a sectional schematic diagram of a structure of a motor according to an embodiment of the present application.
Figure 2:
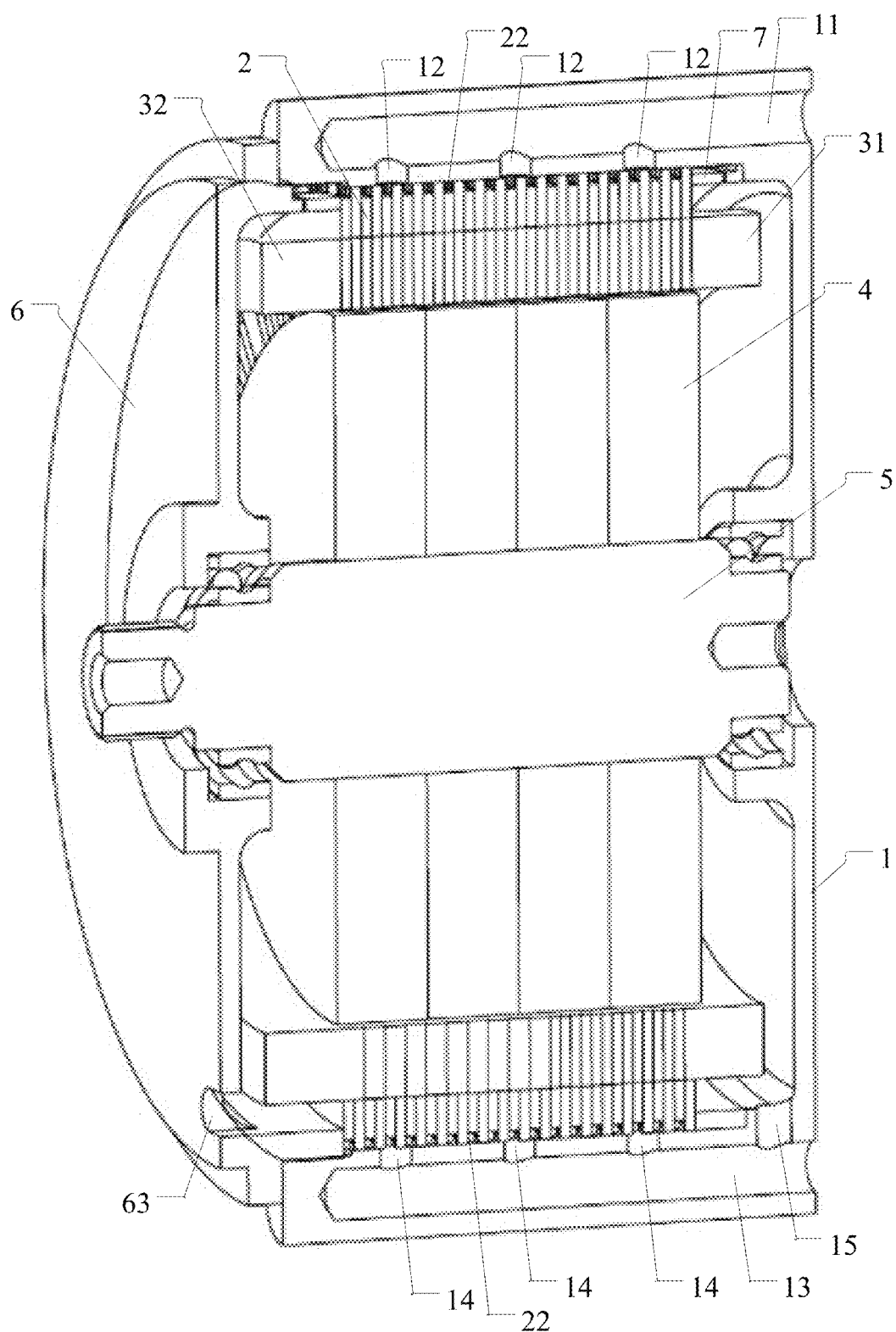
FIG. 2 is a half-sectional schematic diagram of a motor according to an embodiment of the present application.

As shown in FIG. 1 and FIG. 2, an embodiment of the present application provides a motor including a casing 1, a stator core 2, a stator winding 3 (or winding coil), and a rotor 4.

Among them, the stator core 2 is fixed in the casing 1. A slit flow channel is formed between the outer side wall of the stator core 2 and the inner side wall of the casing 1. The slit flow channel is provided as a network-shaped cooling flow channel 22 for the cooling fluid to flow, as shown in FIG. 5 to FIG. 8. The rotor 4 is rotatably sleeved inside the stator core 2.

Stator winding 3 is assembled with the stator core 2. The stator winding 3 may be made of enameled round copper wire or enameled flat copper wire wound according to motor winding rules. In a specific embodiment of the present application, the winding coil is made of enameled flat copper wire. The stator winding 3 is fixedly disposed in a cogging groove 25 of the stator core 2, and a portion of the stator winding 3 beyond the end face of the stator core 2 is defined as an end winding, wherein the end winding includes a front end winding 31 and a rear end winding 32, as shown in FIG. 2.

The motor according to the embodiment of the present application includes a casing 1, a stator core 2, a stator winding 3, a rotor 4 and the like. The stator core 2 is sleeved outside the rotor 4, and the casing 1 is sleeved outside the stator core 2. The rotor 4 may be sleeved outside a rotating shaft 5, wherein the rotating shaft 5 may be configured to pass through the casing 1 and supported by the casing 1, the rotor 4 and the rotating shaft 5 are fixedly connected with each other, and the rotor 4 and the rotating shaft 5 are rotatable relative to the casing 1. Alternatively, a shaft sleeve is disposed between the rotating shaft 5 and the rotor 4, the rotating shaft 5 is fixedly connected with the casing 1, the rotor 4 is fixedly connected with the shaft sleeve, and the shaft sleeve is rotatable relative to the rotating shaft 5. During operation of the motor, the stator winding 3 is electrified to generate an exciting magnetic field, and then energy conversion occurs to output mechanical energy or generate electricity. The stator winding 3 will generate a huge amount of resistance heat while energy conversion occurs. If the resistance heat cannot be dissipated away in time, a temperature of the stator winding 3 will rise rapidly, which will destroy an insulation system of the motor and causes the motor to be burnt. The embodiment of the present application is also devoted to improving heat dissipation capability of the stator winding 3 and improving performance of the motor.

For this regard, in this scheme, a slit flow channel is formed between an outer side wall of the stator core 2 and an inner side wall of the casing 1, wherein the slit flow channel is in the form of a network-shaped cooling flow channel 22. Therefore, a cooling fluid (such as cooling oil) may enter the network-shaped cooling flow channel 22 to exchange heat with the stator core 2, and the stator core 2 also exchanges heat with the stator winding 3, thus ensuring that the cooling fluid can take away the heat of the stator core 2 and the stator winding 3, thereby bringing an effect of reducing temperatures of the stator core 2 and the stator winding 3 and cooling the motor.

Compared with the scheme in which multiple axial oil grooves are formed on the outer side wall of the stator core 2, the network-shaped cooling flow channel 22 of this scheme has a larger heat dissipation surface area, which is conducive to further improving the heat dissipation capacity of the motor. In addition, a flow path of the cooling fluid in the network-shaped cooling flow channel 22 is also network-shaped, and a flow form of the cooling fluid in the network-shaped path is turbulent, so that the heat exchange efficiency of the turbulent flow is higher, and thus the heat dissipation capacity of the motor can be further improved.

In the principle of the motor, the stator core 2 mainly functions as a fixed support for the winding coil, a magnetic circuit path and conduction for the resistance heat of the winding coil. In the embodiment of the present application, the heat generation and conduction path of the motor is as follows: operation of the stator winding 3 generates a large amount of resistance heat Q1, and the temperature reaches t1, the stator core 2 generates heat Q2 under the action of an alternating magnetic field, and the temperature reaches t2. Since t1>t2, heat conduction occurs between stator winding 3 and stator core 2, so that the temperature of the stator core 2 rises to t3. The cooling oil having a temperature of t4 enters the network-shaped cooling flow channel 22 to exchange heat with the stator core 2, and the temperature of the stator core 2 is reduced to t5. Thus, the stator winding 3 of the motor is kept below an extreme temperature for a long period of time by the continuous circulation of the cooling oil in a low temperature.

Figure 3:
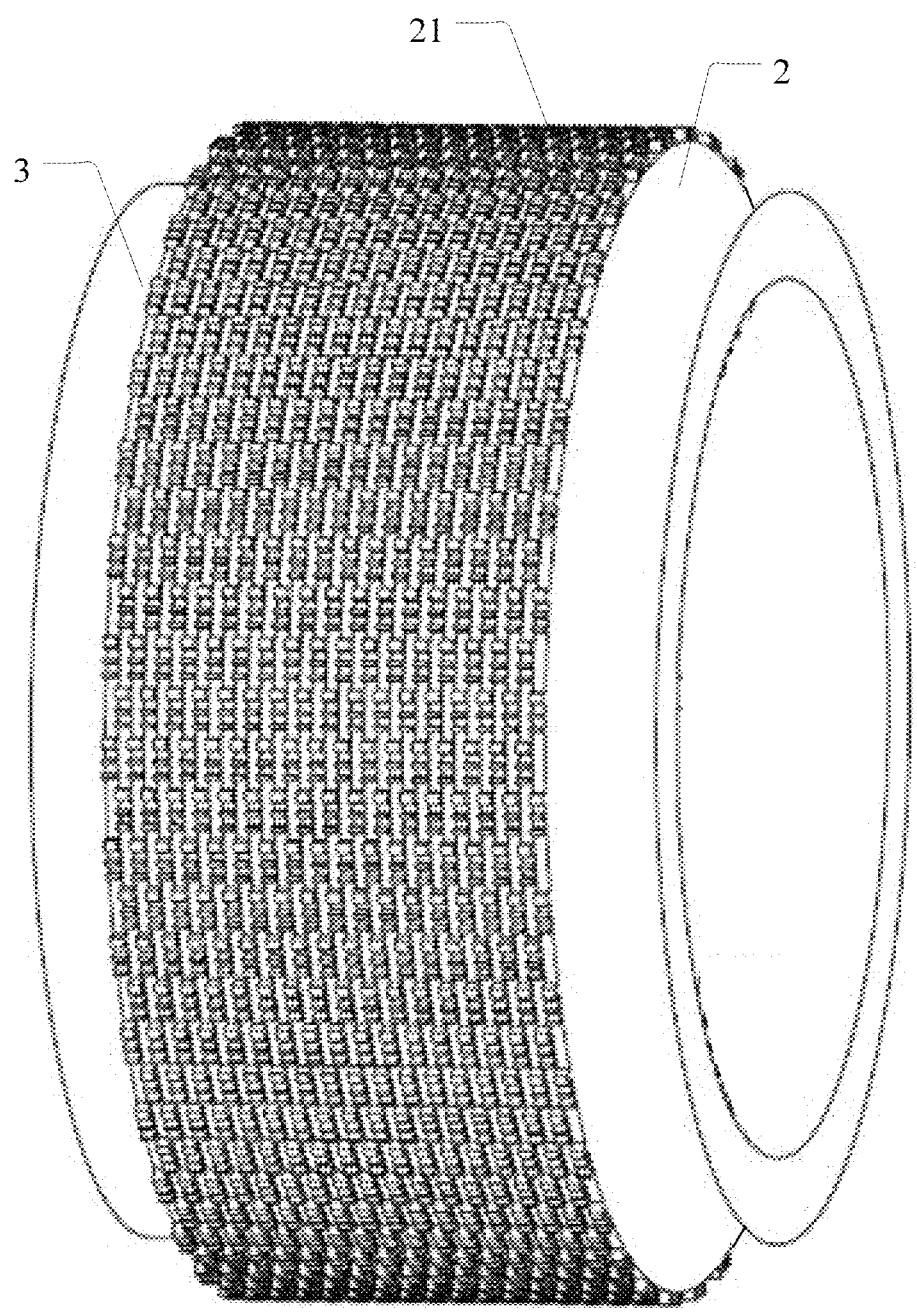
FIG. 3 is a schematic diagram of assembling of a stator core and a stator winding according to an embodiment of the present application.
Figure 4:
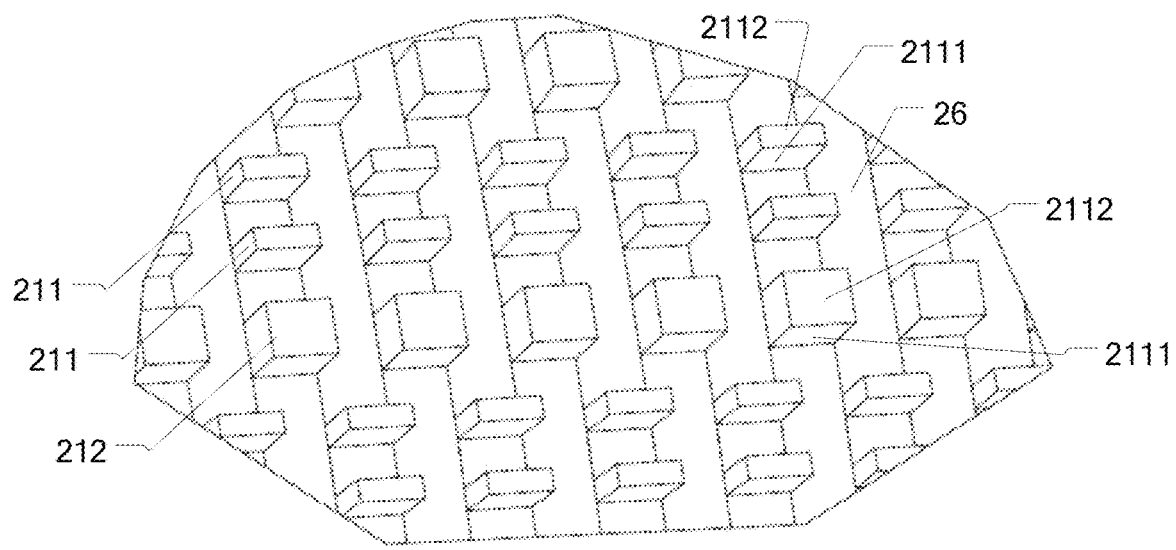
FIG. 4 is a partial enlarged schematic diagram of an outer side wall of a stator core according to an embodiment of the present application.
Figure 5:
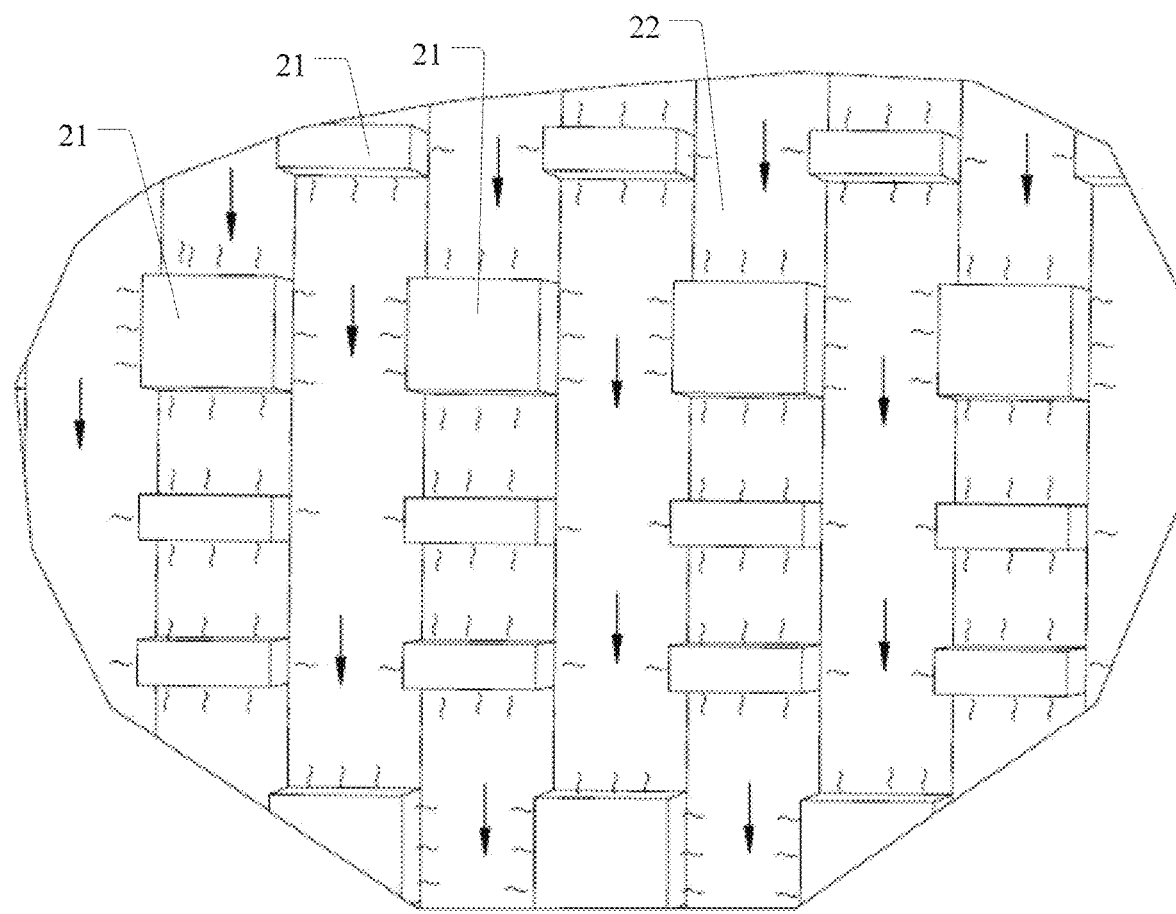
FIG. 5 is a schematic diagram of a principle of heat dissipation of the stator core shown in FIG. 4.

In an exemplary embodiment, multiple heat dissipation protrusions 21 are provided on the inner side wall of the casing 1, or on the outer side wall of the stator core 2, or on the inner side wall of the casing 1 and the outer side wall of the stator core 2, as shown in FIG. 3. As shown in FIG. 4 and FIG. 5, multiple heat dissipation protrusions 21 are staggeredly disposed in a network form, thus the slit flow channel are divided into the network-shaped cooling flow channel 22.

Thus, the casing 1, or the stator core 2, or the casing 1 and the stator core 2 are processed into the desired shape during a manufacturing process, and then the casing 1 and the stator core 2 are assembled together to obtain the network-shaped cooling flow channel 22, without need of increasing the number of components, while assembling processes thereof are relatively simple.

Herein, the heat dissipation protrusions 21 may be provided only on the inner side wall of the casing 1, or only on the outer side wall of the stator core 2 (as shown in FIG. 3), or partially on the inner side wall of the casing 1 and partially on the outer side wall of the stator core 2.

In a case that the heat dissipation protrusions 21 are provided on the inner side wall of the casing 1, the casing 1 may be made of a windable material. Therefore, the heat dissipation protrusions 21 are processed on a flat plate, and then the flat plate structure is wound and fixed into a cylindrical structure by a process such as welding. In this way, the manufacturing processes of the casing 1 can be simplified, which facilitates batch production.

A shape of each heat dissipation protrusion 21 is not limited and may be in a shape of a post, a rod, a plate, a block or the like.

In one example, each heat dissipation protrusion 21 is a post structure, in this case, the heat dissipation protrusions 21 may be referred to as heat dissipation posts 211 as shown in FIG. 4. A specific shape of the heat dissipation post 211 may be, but is not limited to, a prism (such as a quadrangular prism, as shown in FIG. 4), a cylinder, an elliptical post, a semi-cylinder, a pyramid, a circular cone, an irregular shape, or the like.

In an exemplary embodiment, multiple heat dissipation protrusions 21 are provided on the outer side wall of the stator core 2, at least part of the heat dissipation protrusions 21 are against the inner side wall of the casing 1, or all of the heat dissipation protrusions 21 may be against the inner side wall of the casing 1, as shown in FIG. 1 and FIG. 2, so that the stator core 2 and the casing 1 are interference fitted.

The heat dissipation protrusions 21 are provided on the outer side wall of the stator core 2, so that a heat dissipation surface area of the stator core 2 can be significantly increased, thus the heat dissipation capability of the stator core 2 is improved. Moreover, the heat dissipation protrusions 21 of the stator core 2 are against the inner side wall of the casing 1, thereby implementing the interference fit between the stator core 2 and the casing 1 and further implementing the fixed assembling between the stator core 2 and the casing 1. During the assembling, the interference fit between the stator core 2 and the casing 1 can be achieved by using a hot sleeve process.

Figure 13:
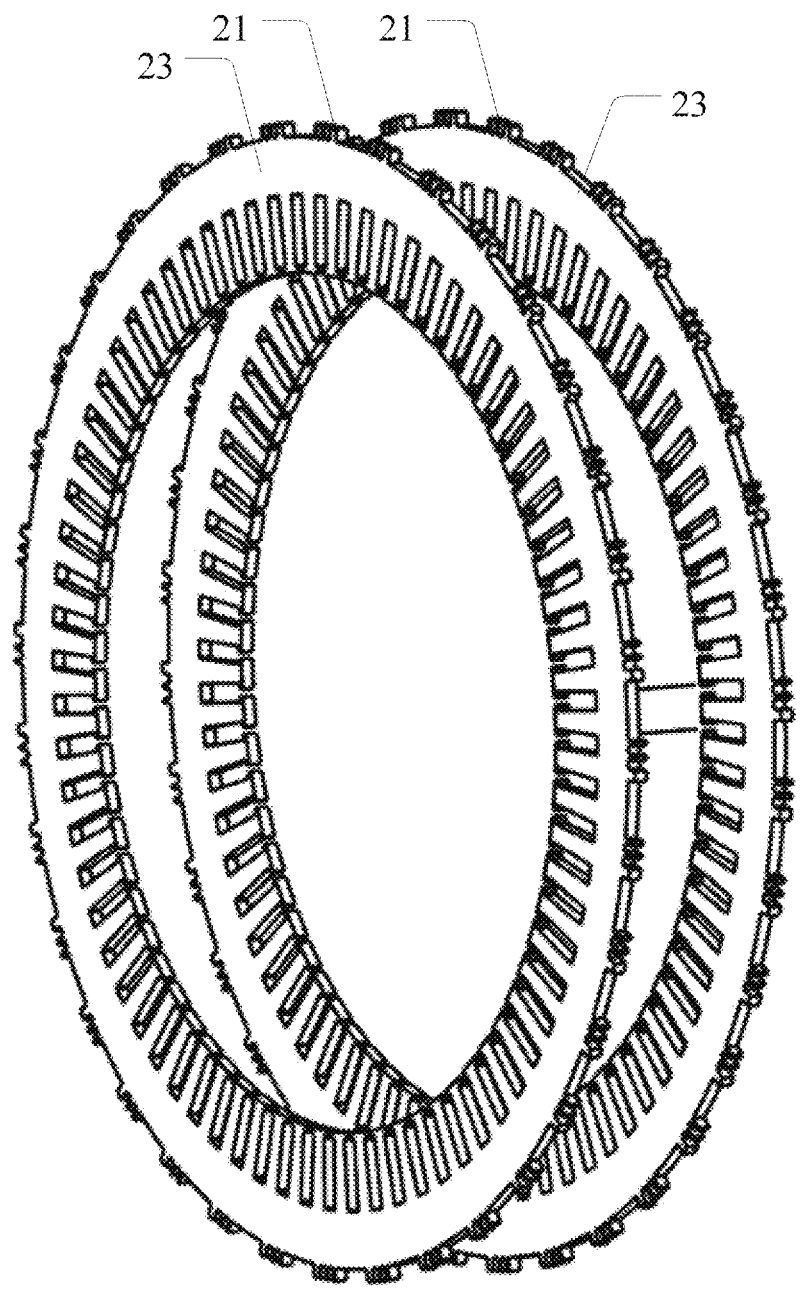
FIG. 13 is a schematic diagram of a misplaced stacking assembling of a core assembly according to an embodiment of the present application.
Figure 14:
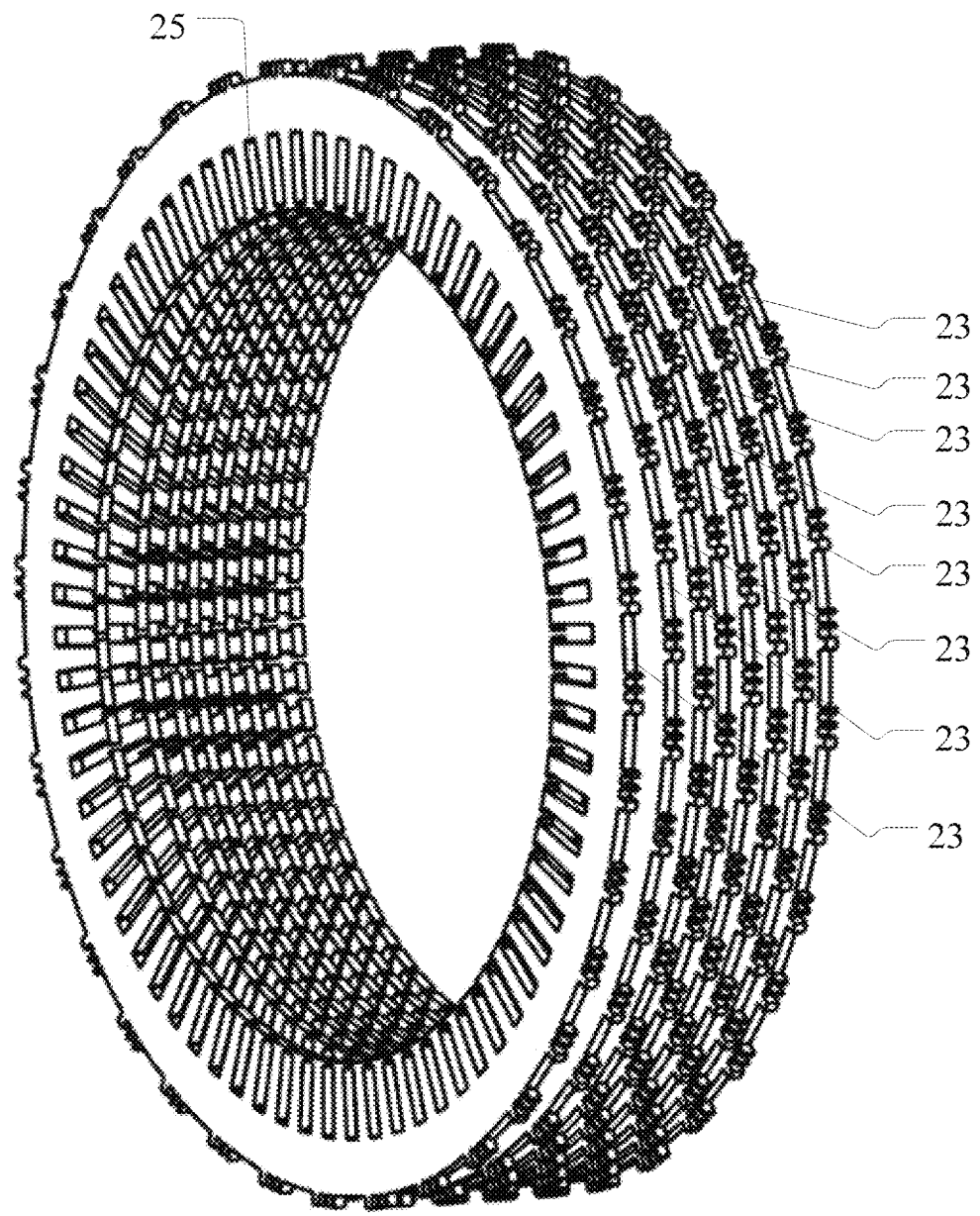
FIG. 14 is a schematic diagram of a misplaced stacking assembling of a stator core according to an embodiment of the present application.

In an exemplary embodiment, the stator core 2 includes multiple core assemblies 23 that are mutually stacked in the axial direction of the stator core 2, as shown in FIG. 14. Each core assembly 23 is provided with multiple heat dissipation protrusions 21 spaced apart along its circumferential direction, as shown in FIG. 13, the heat dissipation protrusions 21 of adjacent core assemblies 23 are staggeredly arranged along the circumferential direction of the stator core 2.

This scheme means to divide the stator core 2 into multiple core assemblies 23 along its axial direction, wherein each of the multiple core assemblies 23 has an annular structure and each of the multiple core assemblies 23 is provided with multiple heat dissipation protrusions 21 along its circumferential direction. The stator core 2 with a novel structure (the outer side wall is provided with multiple heat dissipation protrusions 21 staggeredly arranged in a network-shaped form) is formed by stacking the multiple core assemblies 23 by misplaced stacking.

Since the number of the heat dissipation protrusions 21 on the whole stator core 2 is very large, dividing the stator core 2 into multiple core assemblies 23 can greatly simplify the structure of each single core assembly 23, and facilitate the production and processing of the single core assembly 23, and further reduce the processing difficulty of components. Subsequently, the heat dissipation protrusions 21 staggeredly arranged in a network-shaped form may be obtained simply by misplaced assembling (as shown in FIG. 13 and FIG. 14). Compared with directly processing the heat dissipation protrusions 21 arranged in a network shape, this scheme can greatly reduce the processing difficulty of the stator core 2. Moreover, by adjusting the number of the core assemblies 23, a dimension of the stator core 2 in the axial direction can be adjusted, and various choices can be achieved, which is conducive to meeting requirements of different products.

Figure 15:
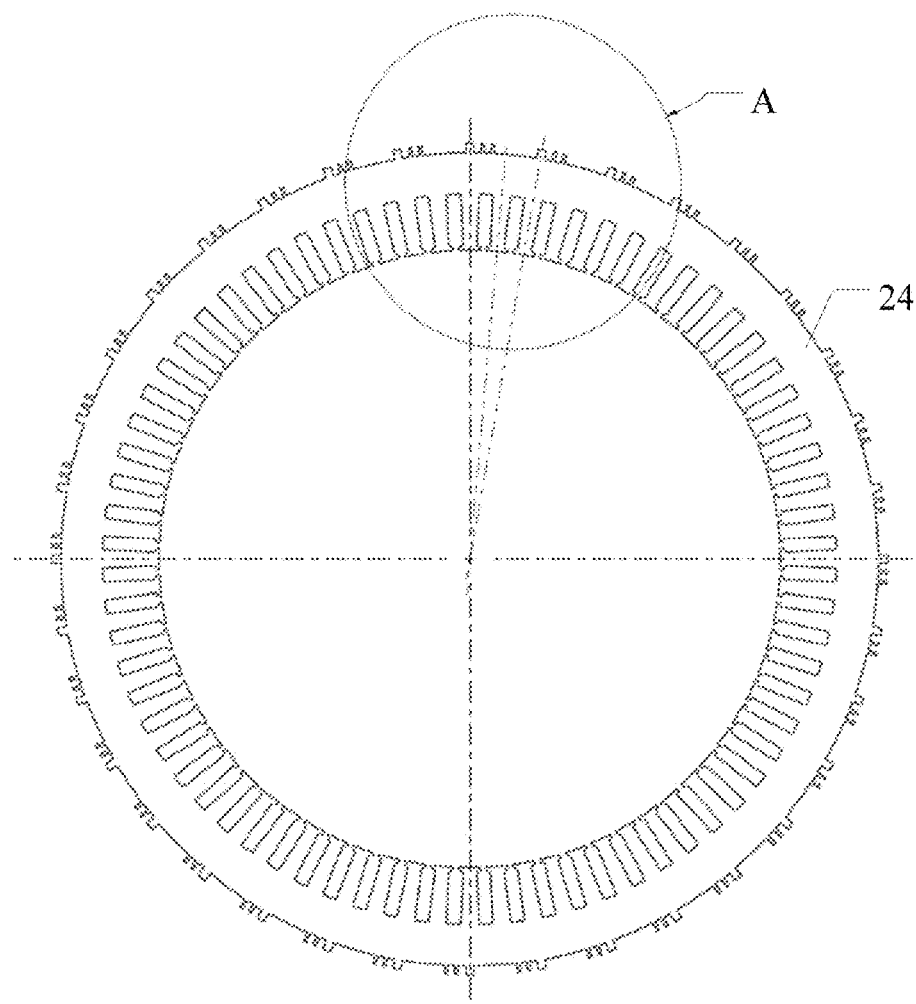
FIG. 15 is a schematic structural diagram of a front view of a stator punching sheet according to an embodiment of the present application.
Figure 16:
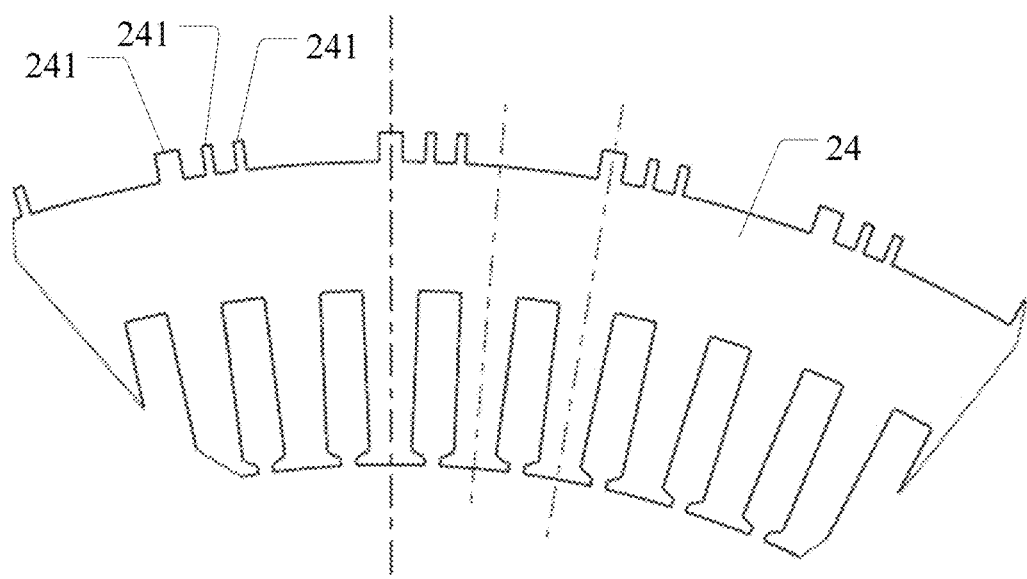
FIG. 16 is an enlarged schematic diagram of part A in FIG. 15.
Figure 17:
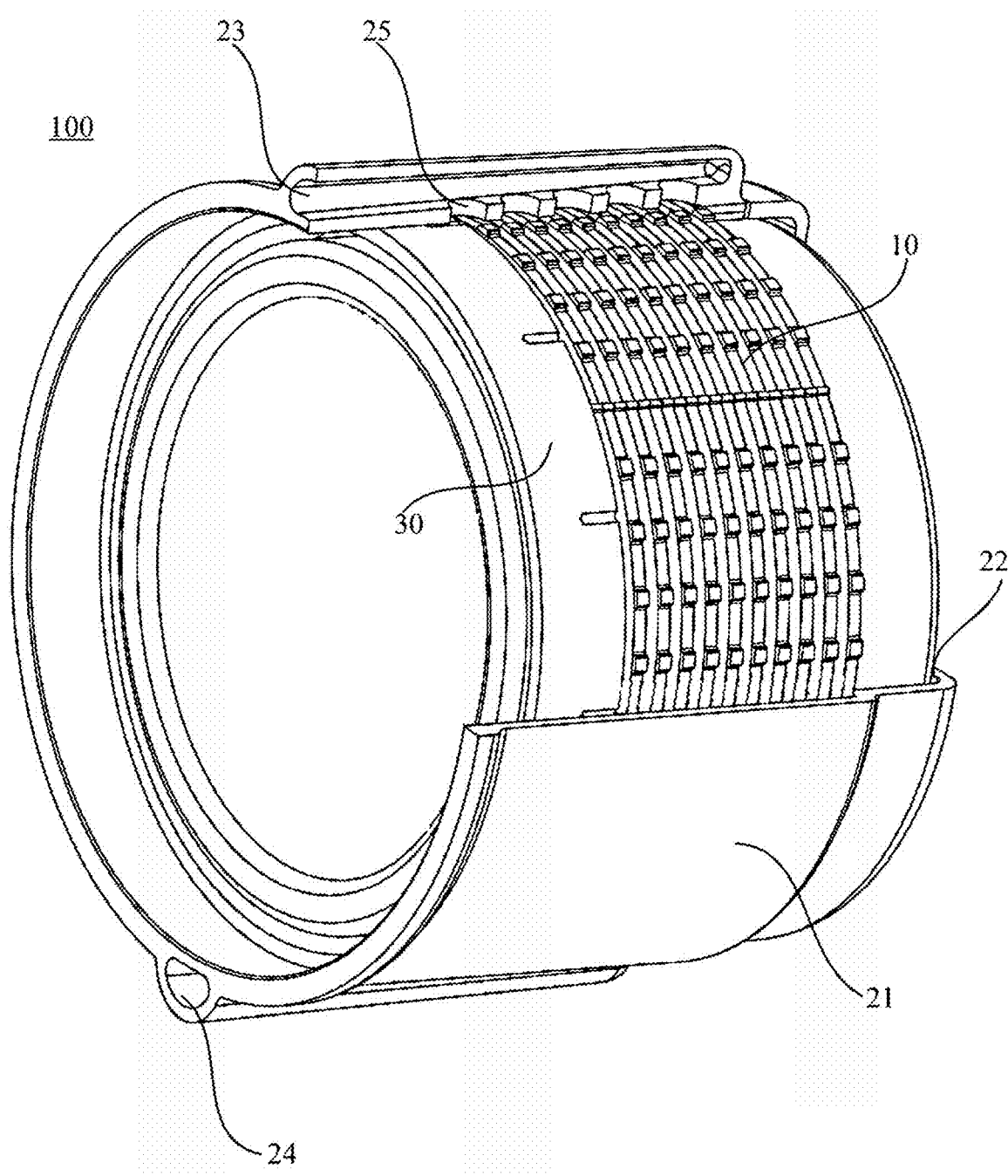
FIG. 17 is a schematic structural diagram of a motor according to another embodiment of the present application.

In an exemplary embodiment, a core assembly 23 is formed by stacking multiple stator punching sheets 24. Each stator punching sheet 24 is provided with multiple heat dissipation teeth 241, as shown in FIG. 15 and FIG. 16. Heat dissipation teeth 241 corresponding to the multiple stator punching sheets 24 are stacked to form the heat dissipation protrusions 21.

Compared with directly producing the core assembly 23 with a large thickness, the relatively thin stator punching sheets 24 are easier to be processed. Therefore, in this scheme, the core assembly 23 is formed by stacking of the multiple stator punching sheets 24, and the heat dissipation protrusions 21 are formed by stacking the heat dissipation teeth 241 of the stator punching sheets 24, so that the processing difficulty of the stator core 2 can be further reduced and the manufacturing costs can be further reduced.

In addition, by adjusting the number of the stator punching sheets 24, the thickness of the core assembly 23 may be adjusted, and then a dimension of the stator core 2 in the axial direction may be adjusted. Multiple core assemblies 23 of the same stator core 2 may also have different thicknesses, and then fine adjustment may be made the dimension of the stator core 2 in the axial direction may, which can further increase diversified choices and contribute to further meet the requirements of different products.

In an actual design and manufacturing process, according to computer fluid dynamics simulation (CFD for short) analysis and simple consideration of working procedures, the scheme suitable for each motor system can be obtained.

In an exemplary embodiment, the number and distribution of the heat dissipation protrusions 21 on the multiple core assemblies 23 are identical. Multiple heat dissipation protrusions 21 on each core assembly 23 are evenly divided into multiple heat dissipation groups. Each heat dissipation group includes at least one heat dissipation protrusion 21.

In this way, only one set of stator punching die is required to obtain various stator cores 2 with different specifications, which changes the present situation in the prior art that stator cores 2 require various punching dies, therefore reducing the manufacturing cost of the stator cores 2.

In an exemplary embodiment, the stator core 2 is provided with multiple cogging grooves 25 along its circumferential direction for mounting the stator winding 3, as shown in FIG. 14. The number of the cogging grooves 25 is an integer multiple of the number of the heat dissipation groups of each core assembly 23.

Thus, in a case that two adjacent core assemblies 23 are stacked, an angle misplaced along the circumferential direction is an integral multiple of an included angle between center lines of adjacent two cogging grooves 25, which not only facilitates an accurate alignment of the core assemblies 23 when they are mutually stacked, but also ensures that the cogging grooves 25 of the adjacent core assemblies 23 still coincide with each other in the axial direction after stacking. Thus, by the misplaced stacking assembling, the heat dissipation protrusions 21 staggeredly arranged in a network-shaped form may be obtained without affecting the stacking of the cogging grooves 25 of the stator core 2.

In one example, the number of the cogging grooves 25 is twice of the number of the heat dissipation groups of each core assembly 23, as may be seen with reference to FIG. 15 and FIG. 16. In other words, for each core assembly 23, the number of the heat dissipation groups is a half of the number of the cogging grooves 25.

This scheme not only does not affect the misplaced stacking assembling of the stator core 2, but also ensures that the stator core 2 has a considerable number of heat dissipation posts 211 and simulation results prove its good heat dissipation effect.

In an exemplary embodiment, each heat dissipation group includes multiple heat dissipation protrusions 21 spaced apart along the circumferential direction of the core assembly 23. A circumferential spacing between adjacent heat dissipation groups is larger than a circumferential spacing between adjacent heat dissipation protrusions 21 in each heat dissipation group, as may be seen with reference to FIG. 15 and FIG. 16.

In this way, the spacing between two adjacent heat dissipation groups may be exactly used for aligning the heat dissipation groups of the adjacent core assemblies 23, which is conducive to serving a certain function in marking and positioning when the core assemblies 23 are stacked.

In an exemplary embodiment, each heat dissipation group includes multiple heat dissipation posts 211 spaced apart along the circumferential direction of the core assembly 23. In each heat dissipation group, one of the heat dissipation protrusions 21 is provided as a positioning protrusion 212, wherein a shape of the positioning protrusion 212 is different from other heat dissipation protrusions 21, as shown in FIG. 4.

In this way, the adjacent core assemblies 23 may be rotated with reference to the positioning protrusions 212 during the misplaced stacking assembling, thereby achieving rapid and accurate stacking of the core assemblies 23.

In one example, in each heat dissipation group, a sectional area of one of the heat dissipation protrusions 21 is larger than that of the other heat dissipation protrusions 21, as shown in FIG. 4.

Thus, the heat dissipation protrusion 21 with the larger sectional area is the positioning protrusion 212, which serves in positioning in addition to increasing the heat dissipation surface area of the stator core 2, thus facilitating rapid and accurate stacking of the core assembly 23.

In one example, each heat dissipation group includes three heat dissipation protrusions 21. Among them, the three heat dissipation protrusions 21 are distributed in a form of "large-small-small" (as shown in FIG. 4), and may also be distributed in a form of "small-large-large" or "small-large-small".

In one example, an included angle α is formed between center lines of two adjacent cogging grooves 25. A center line of the heat dissipation protrusion 21 with the larger sectional area passes through an angular bisector of α, as shown in FIG. 15 and FIG. 16.

Figure 10:
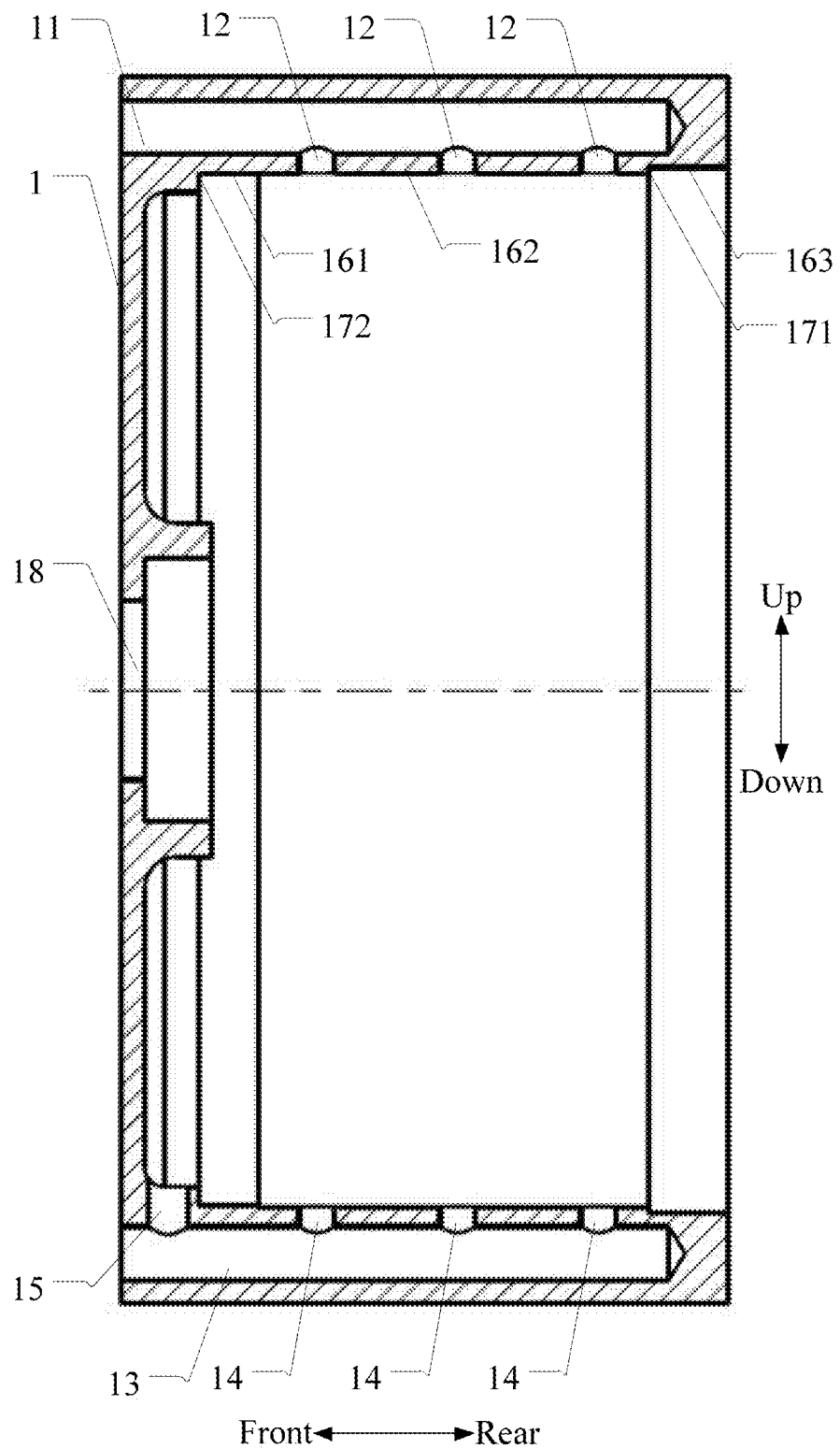
FIG. 10 is a sectional diagram of a structure of a casing according to an embodiment of the present application.

In an exemplary embodiment, as shown in FIG. 1, FIG. 2 and FIG. 10, the casing 1 is further provided with an input channel 11 and at least one input hole 12 communicated with the input channel 11. The input channel 11 is located radially outside the network-shaped cooling flow channel 22 and communicated with the network-shaped cooling flow channel 22 through at least one input hole 12 for inputting cooling fluid to the network-shaped cooling flow channel 22. This facilitates the network-shaped cooling flow channel 22 to access the cooling flow path through the input channel 11, thereby indirectly communicated with a low-temperature cooling fluid supply source (e.g. a cooling oil pool).

As shown in FIG. 2 and FIG. 10, the casing 1 is further provided with an output channel 13 and at least one first output hole 14 communicated with the output channel 13. The output channel 13 is located radially outside the network-shaped cooling flow channel 22 and communicated with the network-shaped cooling flow channel 22 through the at least one first output hole 14 for outputting the cooling fluid discharged from the network-shaped cooling flow channel 22. This facilitates the network-shaped cooling flow channel 22 to access and join an external cooling flow path through the output channel 13, so as to be indirectly communicated with a cooling fluid collection device (such as an oil cooler).

In one example, the number of input holes 12 is plural, as shown in FIG. 10, and the multiple input holes 12 are provided at intervals along the axial direction of the stator core 2. This facilitates the cooling fluid in the input channel 11 to rapidly enter the network-shaped cooling flow channel 22 from multiple positions, and improves uniformity of distribution of the cooling fluid in the network-shaped cooling flow channel 22, thereby further improving the heat dissipation effect.

The number of the first output holes 14 is plural, as shown in FIG. 10, the multiple first output holes 14 are provided at intervals along the axial direction of the stator core 2. This facilitates the cooling fluid of the network-shaped cooling flow channel 22 to flow into the output channel 13 from multiple positions, and the problem of local discharge blind angle in the network-shaped cooling flow channel 22 is avoided, which is conducive to further improving the heat dissipation effects.

Figure 7:
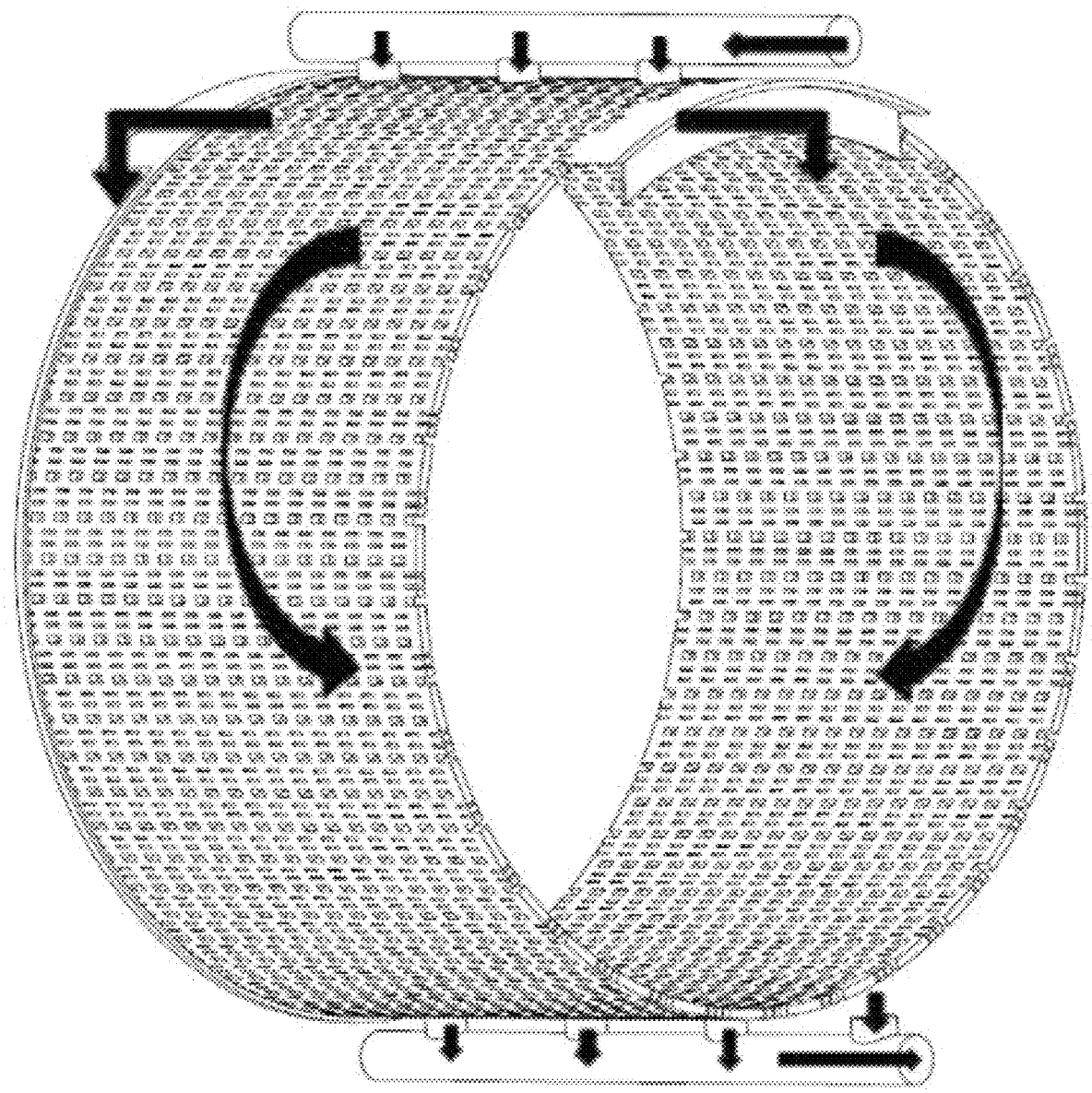
FIG. 7 is a schematic diagram of a principle of the cooling mechanism shown in FIG. 6.

In an exemplary embodiment, the input channel 11 and the input hole 12 are provided at the top of the casing 1, as shown in FIG. 1, FIG. 7 and FIG. 10, so that the input channel 11 is located above the network-shaped cooling flow channel 22.

The output channel 13 and a first output hole 14 are provided at the bottom of the casing 1, as shown in FIG. 1, FIG. 7 and FIG. 10, so that the output channel 13 is located below the network-shaped cooling flow channel 22.

This facilitates the cooling fluid (such as cooling oil) in the input channel 11 to enter the network-shaped cooling flow channel 22 through the input hole 12 under the action of gravity, and flows downward along the network-shaped cooling flow channel 22 under the action of gravity, and is discharged through the output channel 13 at the bottom after heat exchange with the whole stator core 2. Therefore, this scheme is advantageous for the cooling fluid to cover the whole stator core 2, thereby improving the heat dissipation effect and reducing power requirement on the power source (such as an oil pump) used for driving the cooling fluid to flow.

In an exemplary embodiment, portions of two ends of the stator winding 3 protruding out of the stator core 2 are defined as end windings.

Figure 11:
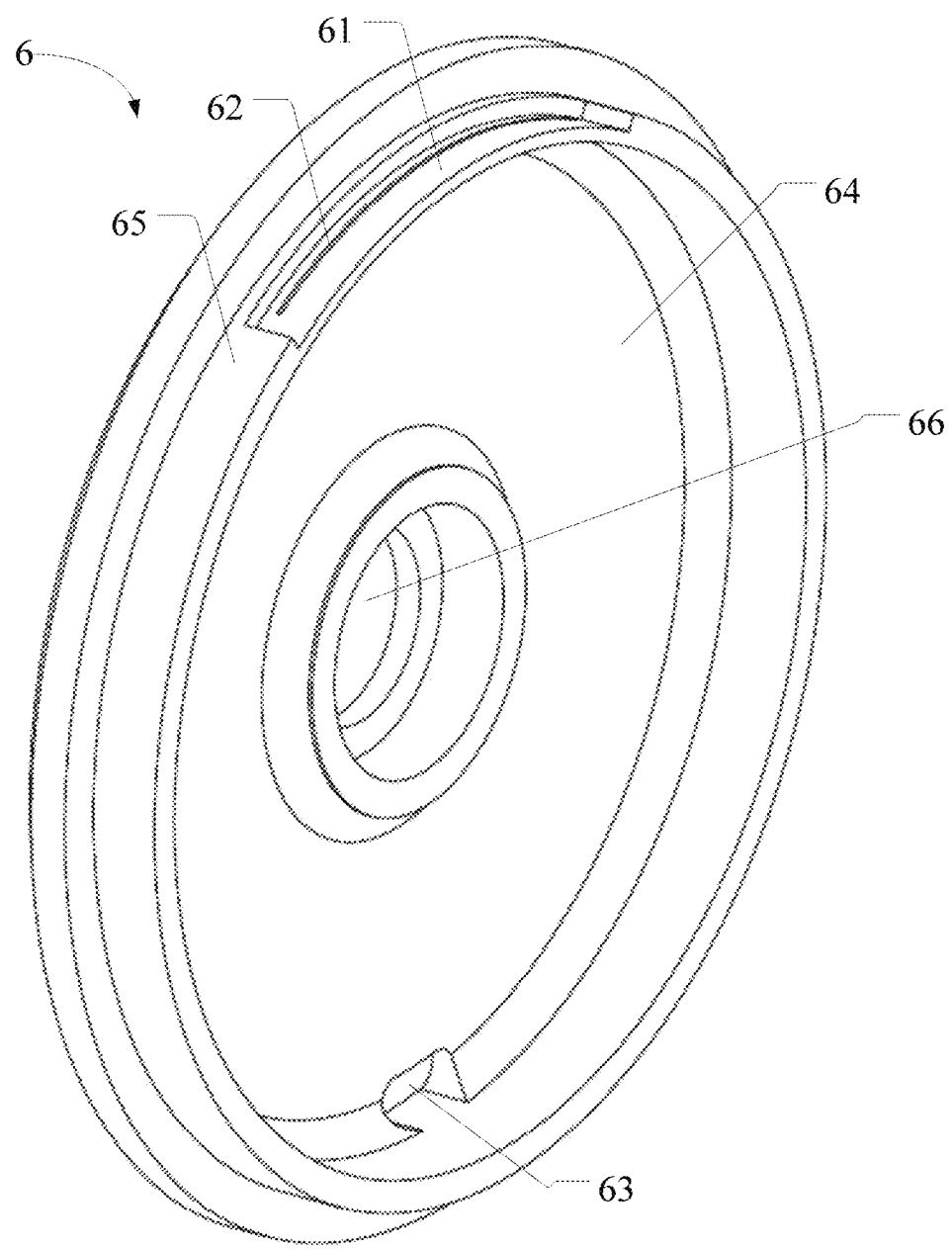
FIG. 11 is a three-dimensional schematic diagram of a structure of an end cap according to an embodiment of the present application.

The casing 1 is provided with an open end. The motor further includes an end cap 6 provided at the open end, as shown in FIG. 1 and FIG. 2. The end cap 6 is provided with a first heat dissipation groove 61, as shown in FIG. 11. The first heat dissipation groove 61 communicates with the network-shaped cooling flow channel 22. A bottom wall of the first heat dissipation groove 61 is provided with a first waterfall-spray slit 62 at a position corresponding to the end winding, as shown in FIG. 11, for spraying a cooling fluid to the end winding corresponding to the first waterfall-spray slit 62.

The end cap 6 is further provided with a second output hole 63, as shown in FIG. 1 and FIG. 11. The second output hole 63 is configured to be in communication with the external cooling flow path for discharging the cooling fluid flowing through the end winding corresponding to the first waterfall-spray slit 62 into the external cooling flow path.

In this way, one branch divided from the cooling fluid in the network-shaped cooling flow channel 22 may enter the first heat dissipation groove 61 and be sprayed to the end winding like a waterfall through the first waterfall-spray slit 62. Compared with the conventional way of spraying cooling oil at multiple points, in this scheme oil sprinkling in a form of waterfall may be used for cooling the end winding, which covers a larger area of the end winding and achieves a more uniform cooling effect. The cooling oil after heat exchange with the end winding may be discharged from the casing 1 through the second output hole 63.

In one example, the second output hole 63 is provided at the bottom of the end cap 6, as shown in FIG. 1, to facilitate the cooling fluid to be collected in the second output hole 63 under the action of gravity and then discharged into the external cooling flow path.

In one example, the casing 1 and the end cap 6 are assembled by nested centring and connecting parts. The inner side wall of the casing 1 is provided with a first supporting surface 171, as shown in FIG. 10. The first support surface 171 is perpendicular to the axial direction of the stator core 2. The end cap 6 includes a cap body 64 and an annular flange 65, as shown in FIG. 11. The cap body 64 is against the open end of the casing 1. One end of the annular flange 65 is connected with the cover 64, and the other end of the annular flange 65 is against the first support surface 171. Moreover, an end of the annular flange 65 that abuts against the first supporting surface 171 protrudes inward from the first supporting surface 171 in the radial direction of the stator core 2 and abuts against the end face of the stator core 2 to block an end of the network-shaped cooling flow channel 22 facing the end cap 6. The first heat dissipation groove 61 is provided on an outer side wall of the annular flange 65 and extends across one end of the annular flange 65 away from the cap body 64 along the axial direction of the stator core 2, so that the first heat dissipation groove 61 communicates with the network-shaped cooling flow channel 22.

Thus, one end of the network-shaped cooling flow channel 22 facing the end cap 6 is blocked by the end cap 6 at other positions in the circumferential direction except the position where the first heat dissipation groove 61 is located. The first heat dissipation groove 61 and the inner side wall of the casing 1 form the cooling flow channel on the end cap 6. Therefore, one branch divided from the cooling fluid flowing through the network-shaped cooling flow channel 22 enters the first heat dissipation groove 61, and is sprayed to an oil curtain through the first waterfall-spray slit 62 to the corresponding end winding in a form similar, so as to efficiently and uniformly dissipate heat from the end winding. The cooling fluid after the heat exchange with the end winding cannot flow back to the network-shaped cooling flow channel 22, but is discharged into the external cooling flow path through the second output hole 6.

In an exemplary embodiment, the number of the open end is one. The motor further includes a waterfall-spray heat dissipation ring 7, as shown in FIG. 1 and FIG. 2. The waterfall-spray heat dissipation ring 7 is sleeved in the casing 1 and is located at one end of the casing 1 away from the open end.

Figure 12:
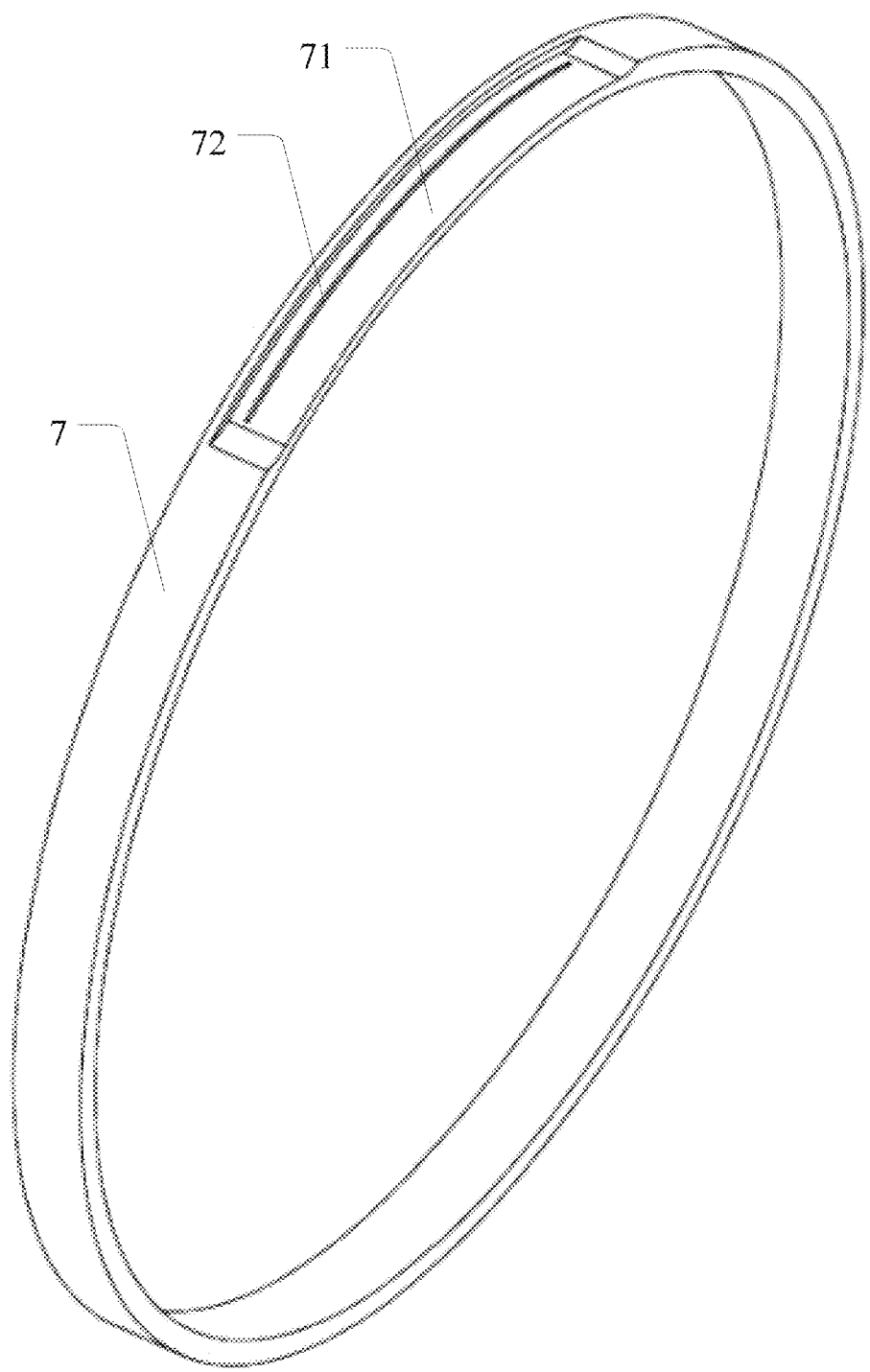
FIG. 12 is a three-dimensional schematic diagram of a structure of a waterfall-spray heat dissipation ring according to an embodiment of the present application.

The waterfall-spray heat dissipation ring 7 is provided with a second heat dissipation groove 71, as shown in FIG. 12. The second heat dissipation groove 71 communicates with the network-shaped cooling flow channel 22. A bottom wall of the second heat dissipation groove 71 is provided with a second waterfall-spray slit 72 at a position corresponding to the end winding, as shown in FIG. 12, for spraying cooling fluid to the end winding corresponding to the second heat dissipation groove 71.

The casing 1 is further provided with a third output hole 15, as shown in FIG. 10, which is configured to be communicated with the external cooling flow path for discharging the cooling fluid flowing through the end winding corresponding to the second waterfall-spray slit 72 into the external cooling flow path.

In one example, the third output hole 15 communicates with the output channel 13 for discharging cooling fluid flowing through the end winding corresponding to the second waterfall-spray slit 72 into the output channel 13. In other words, the third output hole 15 is indirectly communicated with the external cooling flow path through the output channel 13.

In this way, one branch divided from the cooling fluid in the network-shaped cooling flow channel 22 may enter the second heat dissipation groove 71 and be sprayed through the second waterfall-spray slit 72 to the end winding on this side like a waterfall. Compared with the conventional way of spraying cooling oil at multiple points, in this scheme, oil sprinkling in a form of waterfall may be used for cooling the end winding on this side, which covers a larger area of the end winding and achieves a more uniform cooling effect. The cooling oil after the heat exchange with the end winding may enter the output channel 13 of the casing 1 through the third output hole 15 and be discharged from the casing 1.

Compared with the end cap 6, the waterfall-spray heat dissipation ring 7 has lower manufacturing cost and simpler assembling procedure. Therefore, compared with the scheme in which two open ends are formed at two ends of the casing 1 and two end caps 6 are correspondingly provided, one end cap 6 and the assembling process between the end cap 6 and the casing 1 may be omitted in this scheme, which is conducive to reducing the manufacturing cost of the motor. Apparently, it is also possible to provide two open ends at two ends of the casing 1 and correspondingly provide two end caps 6, wherein each end cap 6 is provided with a first heat dissipation groove 61 and a first waterfall-spray slit 62, so as to efficiently and uniformly dissipate heat from the two end windings.

In one example, the third output hole 15 is provided at the bottom of the casing 1, as shown in FIG. 10, to facilitate collecting cooling fluid in the third output hole 15 under the action of gravity, and then discharging the cooling fluid into the output channel 13.

In one example, the casing 1 and the waterfall-spray heat dissipation ring 7 are fitted by hot sleeve. As shown in FIG. 10, the inner side wall of the casing 1 is provided with a second supporting surface 172, wherein the second supporting surface 172 is perpendicular to the axial direction of the stator core 2. One end of the waterfall-spray heat dissipation ring 7 abuts against the second supporting surface 172, and the other end of the waterfall-spray heat dissipation ring 7 abuts against the end face of the stator core 2 to block one end of the network-shaped cooling flow channel 22 facing the waterfall-spray heat dissipation ring 7. As shown in FIG. 12, the second heat dissipation groove 71 is provided on an outer side wall of the waterfall-spray heat dissipation ring 7, and extends across one end of the waterfall-spray heat dissipation ring 7 close to the stator core 2 along the axial direction of the stator core 2, so that the second heat dissipation groove 71 communicates with the network-shaped cooling flow channel 22.

Thus, the end of the network-shaped cooling flow channel 22 facing the waterfall-spray heat dissipation ring 7 is blocked by the waterfall-spray heat dissipation ring 7 at other positions in the circumferential direction except the position where the second heat dissipation groove 71 is located. The second heat dissipation groove 71 and the inner side wall of the casing 1 form the cooling flow channel on the waterfall-spray heat dissipation ring 7. Therefore, one branch divided from the cooling fluid flowing through the network-shaped cooling flow channel 22 enters the second heat dissipation groove 71, and is sprayed through the second waterfall-spray slit 72 to the corresponding end winding in a form similar to an oil curtain, so as to efficiently and uniformly dissipate heat from the end winding.

In an exemplary embodiment, the number of the first water-spray slit 62 is one, as shown in FIG. 12, the first waterfall-spray slit 62 is provided at the top of the end cap 6 and extends along the circumferential direction of the end cap 6, wherein a radian of the first waterfall-spray slit 62 is in a range of 40° to 180°, so as to ensure that the cooling fluid sprayed from the first waterfall-spray slit 62 may cover the upper portion of the end winding in a large area, and then cover the middle and lower portions of the end winding under the action of gravity. In this scheme, only a relatively short first heat dissipation groove 61 and a first waterfall-spray slit 62 need to be provided, so that the structure of the end cap 6 can be simplified, which facilitates improving the strength of the end cap 6.

Alternatively, the number of the first waterfall-spray slits 62 is a plural and the multiple the first waterfall-spray slits 62 are provided at intervals along the circumferential direction of the end cap 6. In this scheme, cooling fluid in a form of water fall may be sprayed to the end winding from many different positions, which is conducive to improving the heat dissipation effect on the end winding.

Alternatively, the number of the first waterfall-spray slit 62 is one, and the first waterfall-spray slit 62 is provided around the end cap 6 along the circumferential direction of the end cap 6. In this scheme, the cooling fluid may be sprayed to the end winding in 360° from all positions, which is conducive to improving the heat dissipation effect for the end winding.

During manufacturing, the number, size and distribution form of the first waterfall-spray slit 62 and the first heat dissipation groove 61 may be reasonably selected according to requirements of different motor systems.

Apparently, the number, size and distribution form of the first waterfall-spray slit 62 and the first heat dissipation groove 61 are not limited thereto, and may be reasonably adjusted as required.

Similarly, as shown in FIG. 11, the number of the second waterfall-spray slit 72 is one, and the second waterfall-spray slit 72 is provided at the top of the waterfall-spray heat dissipation ring 7 and extends along the circumferential direction of the waterfall-spray heat dissipation ring 7, wherein a radian of the second waterfall-spray slit 72 is in a range of 40° to 180°.

Alternatively, the number of second waterfall-spray slits 72 is plural, and the multiple the second waterfall-spray slits 72 are provided at intervals along the circumferential direction of the waterfall-spray heat dissipation ring 7.

Alternatively, the number of the second waterfall-spray slit 72 is one, and the second waterfall-spray slit 72 is provided around the waterfall-spray heat dissipation ring 7 along the circumferential direction of the waterfall-spray heat dissipation ring 7.

Design principle and effect of the second waterfall-spray slit 72 are the same as those of the first waterfall-spray slit 62, which will not be described herein.

In an exemplary embodiment, the motor further includes an oil cooling mechanism (not shown in figures) for the motor in communication with the network-shaped cooling flow channel 22 for supplying cooling oil to the network-shaped cooling flow channel 22 and recycling the cooling oil discharged from the network-shaped cooling flow channel 22.

In this scheme, the motor has an independent oil cooling mechanism, which can achieve cooling and heat dissipation without relying on other structures. The oil cooling mechanism for the motor may be integrated at the bottom of the casing 1.

In one example, the oil cooling mechanism for the motor includes a cooling oil pool, an oil cooler, and an oil pump.

Among them, the cooling oil pool is communicated with the network-shaped cooling flow channel for supplying the cooling oil to the network-shaped cooling flow channel 22. The oil cooler is communicated with the network-shaped cooling flow channel 22 and the cooling oil pool, and is used for cooling the cooling oil discharged from the network-shaped cooling flow channel 22 and conveying it back to the cooling oil pool. The oil pump is used for driving the cooling oil to circulate between the cooling oil pool, the network-shaped cooling flow channel 22 and the oil cooler.

Figure 6:
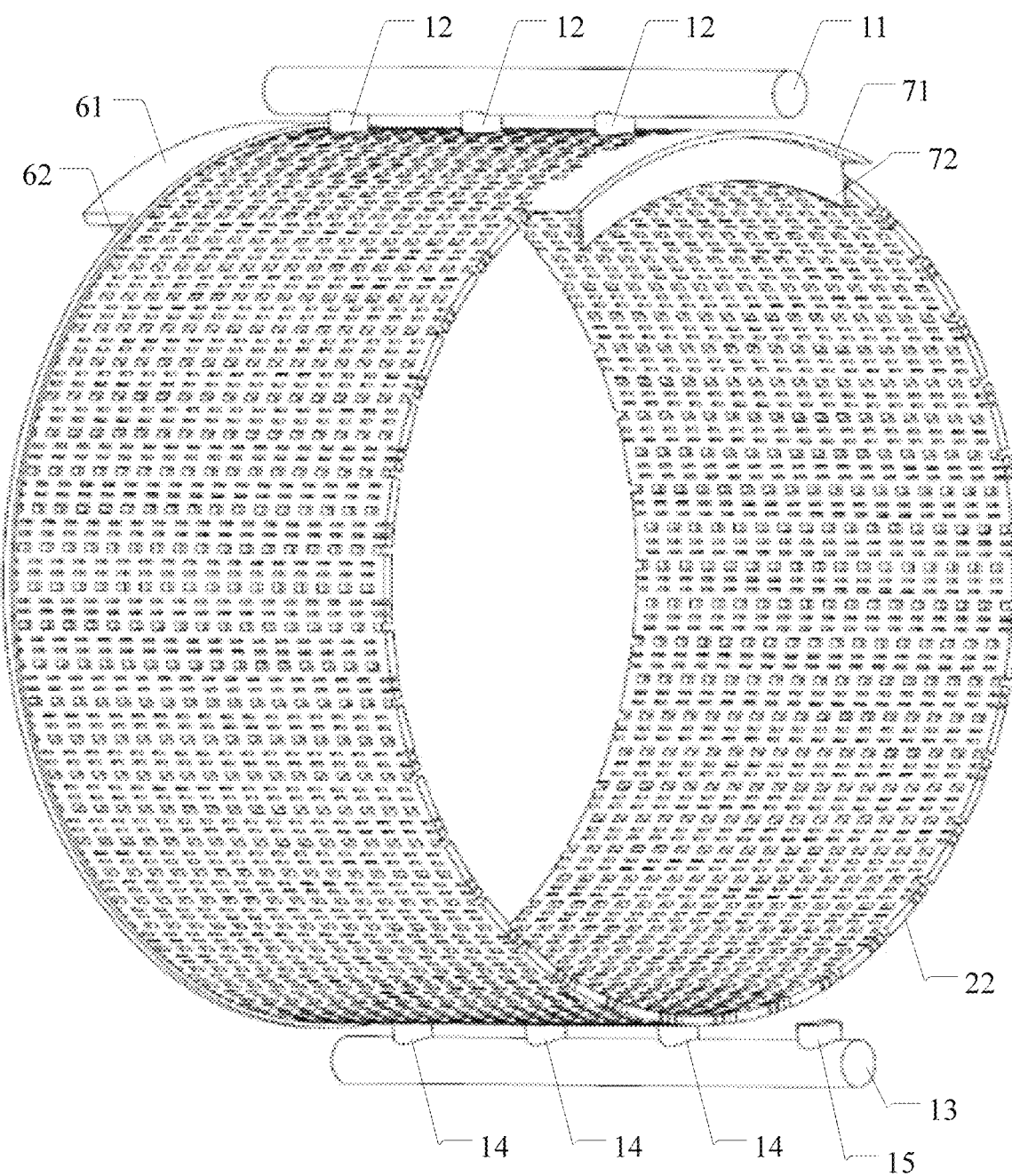
FIG. 6 is a schematic diagram of a cooling mechanism of a motor according to an embodiment of the present application.

In one specific embodiment, the motor includes a motor body and a cooling mechanism (as shown in FIG. 6).

As shown in FIG. 1 and FIG. 2, the motor body includes a rotating shaft 5, a rotor 4 fixedly sleeved on a rotating shaft 5, a stator core 2 sleeved outside the rotor 4 with clearance, a stator winding 3 mounted on the stator core 2, a casing 1 fixedly sleeved outside the stator core 2 for accommodating the above-mentioned components, a waterfall-spray heat dissipation ring 7 sleeved in the casing 1 and abutting an end face of the stator core 2, and an end cap 6 mounted at an open end of the casing 1 for sealing an inner cavity of the motor and supporting the rotating shaft 5. Among them, stator winding 3 extends from two ends of the stator core 2 to form a front end winding 31 and a rear end winding 32 respectively.

As shown in FIG. 3, FIG. 4, and FIG. 6, the cooling mechanism includes a large number of heat dissipation posts 211 provided on an outer side wall of the stator core 2 in a staggered arrangement. As shown in FIG. 4, the heat dissipation posts 211 cuts the cylindrical surface of the outer side wall of the stator core 2 into a lower concave surface 26, heat dissipation post side wall surfaces 2111, and heat dissipation post top surfaces 2112. The heat dissipation post top surfaces 2112 are attached to the inner wall of the casing 1, and the lower concave surface 26 forms a slit flow channel with the inner wall of the casing 1. The slit flow channel is cut by the heat dissipation posts 211 to form a network-shaped cooling flow channel 22, as shown in FIG. 6. During operation, the lower concave surface 26 of the stator core 2 and the heat dissipation post side wall surfaces 2111 both participate in heat conduction as heat exchange surfaces, as shown in FIG. 5.

As shown in FIG. 6 and FIG. 10, the cooling mechanism further includes: an input channel 11 and multiple input holes 12 arranged along an axial direction at the top of the casing 1, an output channel 13 and multiple first output holes 14 arranged along the axial direction at the bottom of the casing 1, and a third output hole 15 arranged at the bottom of the casing 1 and located below the waterfall-spray heat dissipation ring 7.

As shown in FIG. 6 and FIG. 11, the cooling mechanism further includes: a first heat dissipation groove 61 provided at an upper portion of the centring and connecting part of the end cap 6, a first waterfall-spray slit 62 provided at a bottom wall of the first heat dissipation groove 61 and extending along the circumferential direction, and a second output hole 63 provided at the bottom of the end cap 6.

As shown in FIG. 6 and FIG. 12, the cooling structure further includes: a second heat dissipation groove 71 provided on the waterfall-spray heat dissipation ring 7, and a second heat waterfall-spray slit 72 provided on a bottom wall of the second heat dissipation groove 71 and extending along the circumferential direction.

Herein, the input channel 11 is communicated with the input holes 12, and the input holes 12 are communicated with the top of the network-shaped cooling flow channel 22. A front end of the network-shaped cooling flow channel 22 is communicated with the second heat dissipation groove 71, and a rear end of the network-shaped cooling flow channel 22 is communicated with the first heat dissipation groove 61. The bottom of the network-shaped cooling flow channel 22 is communicated with the first output holes 14, and the first output holes 14 are communicated with the output channel 13. The third output hole 15 is communicated with the output channel 13. The output channel 13 and the second output hole 63 are respectively connected to the cooling flow path.

In the embodiment of the present application, with the structural design of the heat dissipation posts 211, the heat dissipation surface area of the stator core 2 is far larger than the original cylindrical outer surface. In principle, a larger number of the heat dissipation posts 211 will be more conducive to the heat dissipation of the stator core 2. However, too many heat dissipation posts 211 cause the network-shaped cooling flow channel 22 to become more densely divided and hinder flowing of the cooling oil. Moreover, the large number of the heat dissipation posts 211 also causes each single heat dissipation post 211 to become smaller, which increases difficulty in the manufacturing processes of the stator punching sheets 24 and the stator core 2. Therefore, in the embodiment of the present application, the number and height of the heat dissipation posts 211 are comprehensive fluid simulation results with flow resistance factors of the cooling oil taken into consideration.

The aforementioned components are described separately in the following.

As shown in FIG. 3, the stator core 2 has a hollow cylindrical shape in appearance. Stator cogging grooves 25 are uniformly provided in the circumferential direction of its inner diameter, with a number of the stator cogging grooves being N1. A main function of the stator cogging grooves 25 is to fix and support the winding coil. At the same time, during operation of the motor, resistance heat of the winding coil is transmitted to the stator core 2 through surfaces of the stator cogging grooves 25.

The stator core 2 is assembled by mutually and staggeredly stacking K core assemblies 23, as shown in FIG. 13 and FIG. 14. N2 heat dissipation posts 211 are circumferentially provided on outer surface of the core assemblies 23.

The N2 heat dissipation posts 211 are equally divided into N½ heat dissipation groups, wherein each heat dissipation group includes A heat dissipation posts 211. The stator core 2 is assembled by the performing misplaced stacking on the core assemblies 23, so that the heat dissipation posts 211 of the adjacent core assemblies 23 are mutually staggered to form the stator core 2 in which the final heat dissipation posts 211 are staggeredly arranged.

Due to the misplaced stacking of the core assemblies 23, the number of the heat dissipation posts 211 in different manufacturing stages satisfies the following relationship:

$$D=N2 \times P;\ N2=N1 \times A \times \tfrac{1}{2};\ A=1,2,3$$

where D is the number of heat dissipation posts 211 of the stator core 2, P is the number of the core assemblies 23, N2 is the number of heat dissipation posts 211 of each core assembly 23, N1 is the number of the stator cogging grooves 25, and A is the number of heat dissipation posts 211 included in each heat dissipation group.

A core assembly 23 includes U stator punching sheets 24, as shown in FIG. 15. A stator punching sheet 24 is punched from electrical steel with a thickness of t. N2 heat dissipation teeth 241 are provided on an outer diameter of each stator punching sheet 24, as shown in FIG. 16. The U stator punching sheets 24 are stacked and pressed axially at a same angle to form a core assembly 23 with a thickness of Y=U×T. The heat dissipation teeth 241 of the stator punching sheets 24 are also changed into heat dissipation posts 211 after multiple sheets are stacked.

The thickness of the core assembly 23 may not be unique. The thickness of a single core assembly 23 is calculated by multiplying the thickness of the stator punching sheets 24 by the number of the sheets. By selecting the number of the stator punching sheets 24, the thickness adjustment of the core assembly 23 can be realized. Therefore, the stator core 2 composed of core assemblies 23 with different thicknesses may be obtained, thereby achieving diversified choices. Finally, by computer fluid dynamics simulation (CFD for short) analysis and simple consideration of working procedures, a better scheme for each motor system can be obtained.

As shown in FIG. 1 and FIG. 2, the end cap 6 is provided at a rear end of the casing 1, and a corresponding end winding is the rear end winding 32. As shown in FIG. 11, the top of the end cap 6 is provided with a first heat dissipation groove 61 and a first waterfall-spray slit 62, and the bottom of the end cap 6 is provided with a second output hole 63. As shown in FIG. 1 and FIG. 2, the waterfall-spray heat dissipation ring 7 is provided at the front end of the casing 1, and a corresponding end winding is the front end winding 31. As shown in FIG. 12, the top of the waterfall-spray heat dissipation ring 7 is provided with a second heat dissipation groove 71 and a second waterfall-spray slit 72. As shown in FIG. 10, the bottom of the casing 1 is provided with a third output hole 15. The end cap 6 is provided with a first support hole 66, as shown in FIG. 11. The front end of the casing 1 is provided with a second support hole 18, as shown in FIG. 10. Two ends of the rotating shaft 5 are rotatably inserted in the first support hole 66 and the second support hole 18 respectively, as shown in FIG. 1 and FIG. 2.

As shown in FIG. 10, the input channel 11 is provided at the top of the casing 1 and an inlet of the input channel 11 is provided at a front end face of the casing 1. The output channel 13 is provided at the bottom of the casing 1, and an outlet of the output channel 13 is provided at the front end face of the casing 1.

As shown in FIG. 10, an inner diameter of the second support surface 172 is less than a diameter of a main body portion of the inner side wall of the casing 1 which is less than an outer diameter of the first support surface 171, so that the inner side wall of the casing 1 forms a step-like structure. Regarding the two axial ends of the stator core 2 as the dividing interface, the inner side wall of the casing 1 includes a first inner wall 161, a second inner wall 162 and a third inner wall 163. The front end of the first inner wall 161 is connected with the second support surface 172, and the second inner wall 162 is connected with the third inner wall 163 by the first support surface 171.

The first inner wall 161 of the casing 1 is in interference fit with the waterfall-spray heat dissipation ring 7 by heat sleeve. The second heat dissipation groove 71 on the waterfall-spray heat dissipation ring 7 and the first inner wall 161 form an oil sprinkling channel. The second waterfall-spray slit 72 on the waterfall-spray heat dissipation ring 7 is an oil sprinkling port for the front end winding 31. The cooling oil flows out through the oil sprinkling port, pours on an upper surface of the front end winding 31 in an oil curtain state, flows from the upper surface to a lower surface of the front end winding 31 relying on the action of gravity, and finally is collected at the bottom of the casing 1, and discharged through the third output hole 15.

The second inner wall 162 of the casing 1 is fitted with the stator core 2 by hot sleeve, while the stator core 2 is also in planar contact with a rear end face of the waterfall-spray heat dissipation ring 7. The heat dissipation post top surfaces 2112 of the stator core 2 are in contact with the second inner wall 162 of the casing 1, and the stator core 2 is fixed by a clamping force of the second inner wall 162 of the casing 1 against the heat dissipation post top surfaces 2112. Under support of the heat dissipation posts 211, the lower concave surface 26 of the stator core 2 (i.e., a surface of the outer side wall of the stator core 2 lower than the heat dissipation posts 211) and the second inner wall 162 form a slit flow channel. The slit flow channel is cut by the staggeredly arranged heat dissipation posts 211 to form a network-shaped cooling flow channel 22 for cooling the stator core 2.

The third inner wall 163 of the casing 1 is assembled with the end cap 6 by nested centring and connecting parts. The first heat dissipation groove 61 of the end cap 6 and the third inner wall 163 of the casing 1 form an oil sprinkling channel on the end cap 6. An end face of the centring and connecting part of the end cap 6 is in contact with the rear end face of the stator core 2, so as to block the slit flow channel between the stator core 2 and the second inner wall 162 except the position where the first heat dissipation groove 61 is located. The bottom of the first heat dissipation groove 61 is provided with a narrow circumferential oil sprinkling slit, i.e., a first waterfall-spray slit 62. After entering the oil sprinkling channel of the end cap 6, the cooling oil is sprayed on an upper portion of the rear end winding 32 at the first waterfall-spray slit 62. By the action of gravity, the cooling oil flows from the upper surface to the lower surface of the rear end winding 32, and finally collected at the bottom of an inner cavity of the motor, and discharged through the second output hole 63 at the bottom.

When in use, the cooling oil enters the network-shaped cooling flow path and flows separately as four branches, as shown in FIG. 7.

First branch: the cooling oil is sprayed to the upper portion of the front end winding 31 of the inner cavity of the motor through the second heat dissipation groove 71 and the second waterfall-spray slit 72, then the cooling oil flows downward along a contour of winding coil under the action of gravity, and is collected at the bottom of the inner cavity of the motor, and discharged through the third output hole 15.

Second branch and third branch: the cooling oil is at the highest position after entering the network-shaped cooling flow channel 22. Seen from a transverse section, the cooling oil is subjected to dual actions of the gravity and a high pressure of the oil path, and then flows separately to the left side and right side. The two branches on the left and right sides are the second branch and the third branch. The cooling oil of the second branch and the third branch flows downwards and is collected and discharged at the first output hole 14 at the bottom.

Fourth branch: similar to the first branch, the cooling oil is sprayed on the upper portion of the rear end winding 32 through the first heat dissipation groove 61 and the first waterfall-spray slit 62, and after cooling the winding coil, the cooling oil is discharged through the second output hole 63 at the bottom of the end cap 6.

In the second branch and the third branch, no matter whether the cooling oil flows in the left branch or the right branch, it is in sufficient contact with the heat dissipation surface of the stator core 2, and the main heat exchange for cooling the stator takes place. From the relationship between the heat dissipation area of the stator core 2 and the number of the heat dissipation posts 211, it may be seen that a larger number of the heat dissipation posts 211 will be more conducive for the heat dissipation of the stator.

FIG. 6 and FIG. 7 are schematic diagrams of materializing the cooling mechanism for convenience of understanding. The network-shaped cooling flow channel 22 is a flow channel defined by space between the stator core 2 and the casing 1, and is not an independent structure, but is schematically shown as an independent network in FIG. 6 and FIG. 7. The input channel 11 and the output channel 13 are two channels provided in the casing 1 and are schematically shown as two independent pipes in FIG. 6 and FIG. 7.

Similarly, the first heat dissipation groove 61 and the first waterfall-spray slit 62 provided on the end cap 6 are also schematically shown in a materialized manner. The first heat dissipation groove 61 is connected behind the network-shaped cooling flow channel 22 and schematically shown as being in communication with the rear end of the network-shaped cooling flow channel 22. The first waterfall-spray slit 62 is connected below the first heat dissipation groove 61, and schematically shown as being in communication with the first heat dissipation groove 61, and spraying cooling oil downward.

The second heat dissipation groove 71 and the second heat dissipation groove 72 provided on the waterfall-spray heat dissipation ring 7 are also materialized accordingly. The second heat dissipation groove 71 is connected in front of the network-shaped cooling flow channel 22 and schematically shown as being in communication with the front end of the network-shaped cooling flow channel 22. The second waterfall-spray slit 72 is connected below the second heat dissipation groove 71 and schematically shown as being in communication with the second heat dissipation groove 71 and spraying cooling oil downward.

In this way, a flow path of the cooling oil may be clearly seen with reference to FIG. 6 and FIG. 7, and a cooling principle of the motor according to this embodiment may also be clearly known.

Figure 8:
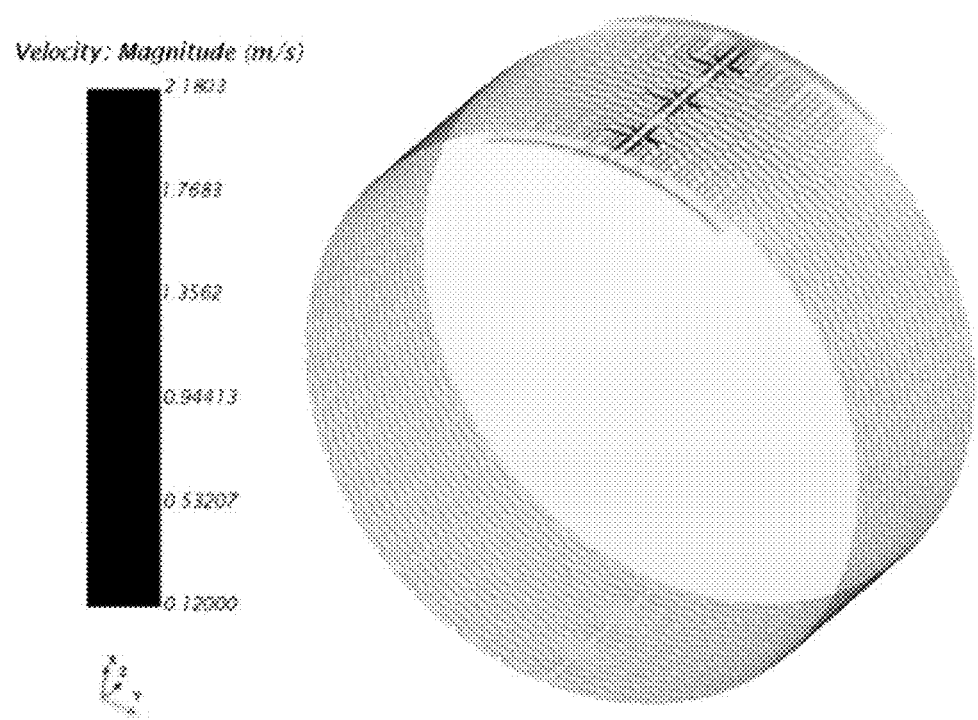
FIG. 8 is a simulation schematic diagram of a flow rate distribution of cooling oil of the cooling mechanism shown in FIG. 6.

FIG. 8 is a simulation schematic diagram of flow rate of cooling oil. In FIG. 8, lines at the top of the network-shaped cooling flow channel 22 indicating the cooling oil are darker and thicker, and it is clear that two thick black lines extend toward two ends in the axial direction, representing the first branch and the fourth branch respectively, and there are three leftward branches (indicating the second branch) and three rightward branches (indicating the third branch).

Figure 9:
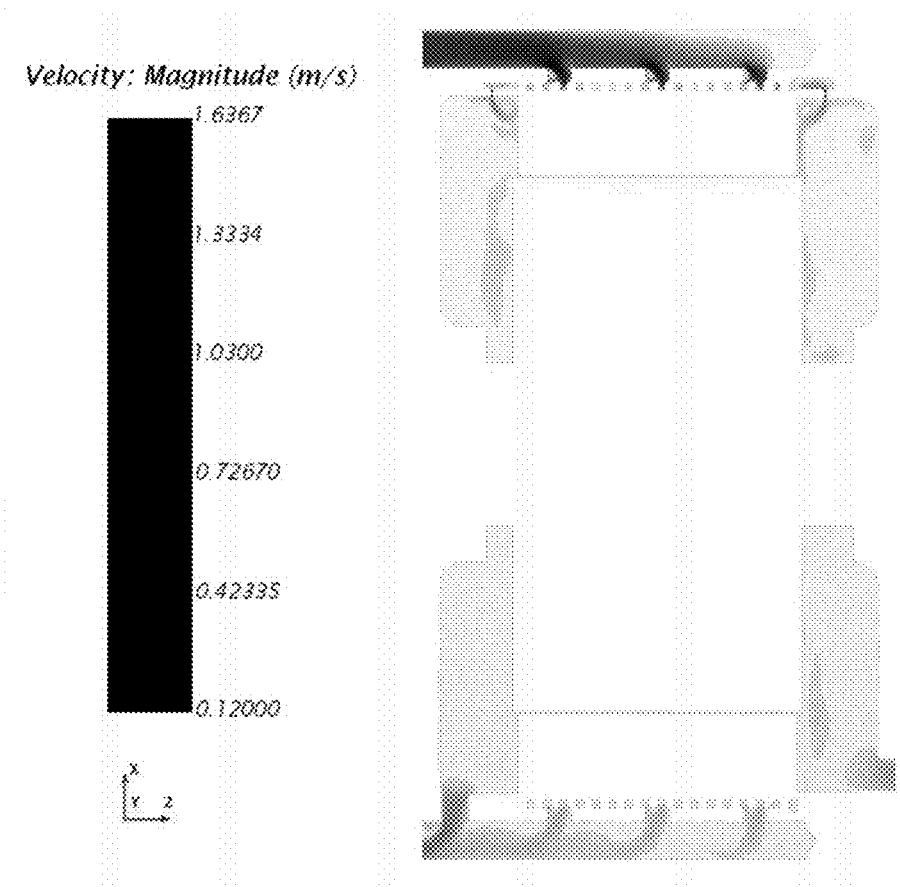
FIG. 9 is a simulation schematic diagram of a cooling oil flow path of the cooling mechanism shown in FIG. 6.

FIG. 9 is a simulation schematic diagram of a flow path of cooling oil. In FIG. 9, it may be clearly seen that the cooling oil enters the network-shaped cooling flow channel 22 downward from the input channel 11 at the top through the three input holes 12. The cooling oil on the lower side of the network-shaped cooling flow channel 22 enters the output channel 13 through three first output holes 14. The cooling oil in the output channel 13 is discharged through a front end outlet. A part of the cooling oil at the front end of the network-shaped cooling flow channel 22 flows downwards via the front end winding 31 and is discharged into the output channel 13 through the third output hole 15. A part of the cooling oil at the rear end of the network-shaped cooling flow channel 22 flows downwards via the rear end winding 32 and is discharged through the second output hole 63 at the bottom of the end cap 6.

In this embodiment, a large number of staggeredly arranged heat dissipation posts 211 are provided on the stator core 2 of the motor, so that the heat dissipation surface area of the motor is significantly increased, thus a cooling model of network-shaped turbulence is implemented. A unique stator punching sheet die is employed, so that the manufacturing cost of the motor is low. The cooling mechanism sprays the cooling oil to an end winding in a manner of waterfall oil curtain, so that the cooling oil is in direct contact with the end winding evenly, ensuring sufficient cooling, thereby improving heat dissipation performance of the motor under high power, and expanding output performance and application scenarios of the motor.

As shown in FIG. 3, an embodiment of the present application provides a stator core 2. An outer side wall of the stator core 2 is provided with multiple heat dissipation protrusions 21, wherein the multiple heat dissipation protrusions 21 are staggeredly arranged in a network-shaped form.

The stator core 2 according to the embodiment of the present application, after being assembled with a casing 1, may form a network-shaped cooling flow channel 22 with the shell 1, which has a larger heat dissipation surface area, thus being conducive to further improving heat dissipation capacity of the motor. In addition, a flow path of a cooling fluid in the network-shaped cooling flow channel 22 is also network-shaped, and a flow form of the cooling fluid in the network-shaped path is turbulent, so that heat exchange efficiency of the turbulent flow is higher, and thus the heat dissipation capacity of the motor can be further improved.

The heat dissipation protrusions 21 are provided on the outer side wall of the stator core 2, so that the heat dissipation surface area of the stator core 2 can be significantly increased, thereby the heat dissipation capability of the stator core 2 is further improved. Moreover, the heat dissipation protrusions 21 of the stator core 2 are against an inner side wall of the casing 1, thereby implementing interference fit between the stator core 2 and the casing 1 and further implementing fixed assembling between the stator core 2 and the casing 1. During the assembling, the interference fit between the stator core 2 and the casing 1 can be achieved by using a hot sleeve process.

In an exemplary embodiment, as shown in FIG. 14, the stator core 2 includes multiple core assemblies 23 that are mutually stacked in an axial direction of the stator core 2. Each core assembly 23 is provided with multiple heat dissipation protrusions 21 spaced apart along its circumferential direction. Heat dissipation protrusions 21 of adjacent core assemblies 23 are staggeredly arranged along a circumferential direction of the stator core 2, as shown in FIG. 13. Technical effects of this scheme may be interpreted with reference to the above-mentioned embodiment of the motor, which will not be repeated here.

In an exemplary embodiment, the core assembly 23 is formed by stacking multiple stator punching sheets 24, as shown in FIG. 15. Each stator punching sheet 24 is provided with multiple heat dissipation teeth 241, as shown in FIG. 16. Heat dissipation teeth 241 corresponding to the multiple stator punching sheets 24 are stacked to form the heat dissipation protrusions 21. Technical effects of this scheme may be interpreted with reference to the above-mentioned embodiment of the motor, which will not be repeated here.

In an exemplary embodiment, the number and distribution of the heat dissipation protrusions 21 on the multiple core assemblies 23 are identical. Multiple heat dissipation protrusions 21 on each core assembly 23 are equally divided into multiple heat dissipation groups, wherein each of the heat dissipation groups includes at least one heat dissipation protrusion 21. Technical effects of this scheme may be interpreted with reference to the above-mentioned embodiment of motor, which will not be repeated here.

In an exemplary embodiment, the stator core 2 is provided with multiple cogging grooves 25 along its circumferential direction for mounting a stator winding 3, as shown in FIG. 14. The number of the cogging grooves 25 is an integer multiple of the number of the heat dissipation groups of each core assembly 23.

In one example, for each core assembly 23, the number of the heat dissipation groups is a half of the number of the cogging grooves 25. Technical effects of this scheme may be interpreted with reference to the above-mentioned embodiment of the motor, which will not be repeated here.

In an exemplary embodiment, each heat dissipation group includes multiple heat dissipation protrusions 21 spaced apart along the circumferential direction of the core assembly 23. A circumferential spacing between adjacent heat dissipation groups is larger than a circumferential spacing between adjacent heat dissipation protrusions 21 in each heat dissipation group. Technical effects of this scheme may be interpreted with reference to the above-mentioned embodiment of the motor, which will not be repeated here.

In an exemplary embodiment, each heat dissipation group includes multiple heat dissipation posts 211 spaced apart along the circumferential direction of the core assembly 23. In each heat dissipation group, one of the heat dissipation protrusions 21 is provided as a positioning protrusion 212, as shown in FIG. 4. A shape of the positioning protrusion 212 is different from that of other heat dissipation protrusions 21.

In one example, in each heat dissipation group, a sectional area of one of the heat dissipation protrusions 21 is larger than that of the other heat dissipation protrusions 21, as shown in FIG. 4. Technical effects of this scheme may be interpreted with reference to the above-mentioned embodiment of the motor, which will not be repeated here.

An embodiment of the present application provides a power assembly (not shown in figures) including the motor of any aforementioned embodiments, which thus has all of the aforementioned beneficial effects, which will not be repeated here.

In an exemplary embodiment, the power assembly further includes a speed reducer and a controller.

Herein, the speed reducer is mechanically connected with the motor. The controller is electrically connected with the motor.

In one example, the speed reducer includes a gearbox, and a gear set, a cooling oil pool, an oil pump, and an oil cooler located within the gearbox. The gear set is connected with the rotating shaft 5 of the motor. The casing 1 of the motor is connected or integrated with a box body of the gearbox. The cooling oil pool, the oil pump, the oil cooler and the box body of the gear box cooperate with each other to form an oil cooling mechanism of the speed reducer.

In a case that the motor does not have an independent oil cooling mechanism for the motor, the oil cooling mechanism of the speed reducer may provide low-temperature cooling oil for the motor and recycle high-temperature cooling oil.

An embodiment of the present application provides an automobile (not shown in figures) including the power assembly according to any of the aforementioned embodiments, which thus has all the aforementioned beneficial effects, which will not be repeated here.

To sum up, in the motor according to the embodiment of the present application, the heat dissipation surface area of the stator core is increased by disposing a large number of heat dissipation protrusions, changing the oil flow form to turbulence, and using cooling measures such as waterfall-spray oil cooling for coil windings, so as to greatly improve the heat dissipation efficiency of the motor. Due to the improvement of the heat dissipation efficiency, the motor system can achieve higher power output under restriction of a same extreme temperature.

In the aspect of manufacturing, only one stator punching die may be involved, and the stator core may be manufactured by misplaced assembling. Since there are few types of stator punching sheets, it may operate efficiently in manufacturing efficiency, warehouse logistics, quality control, and other aspects, which will greatly reduce the production cost of motor stator assembly.

FIG. 17 to FIG. 23 are schematic structural diagrams of a motor and components thereof according to an embodiment of the present application. As shown in FIG. 17 to FIG. 23, this embodiment provides a motor 100, wherein the motor 100 includes a stator core 10 and a housing 20 (i.e. the casing in the aforementioned embodiments). The stator core 10 is formed by mutually staggeredly stacking multiple annular core punching sheets 11. A main body structure of the stator core 10 is formed by mutually stacking multiple core punching sheets 11. After the multiple core punching sheets 11 are stacked, a flow channel (i.e., the slit flow channel in the aforementioned embodiments) is formed between the core punching sheets 11 and the housing 20, and a liquid (e.g. a cooling liquid such as cooling oil) may flow in the flow channel, thereby cooling the motor 100.

Since the stator core 10 of this embodiment is formed by mutually stacking multiple core punching sheets 11, the manufacturing process of the core punching sheets 11 is simple with a low manufacturing cost.

Figure 18:
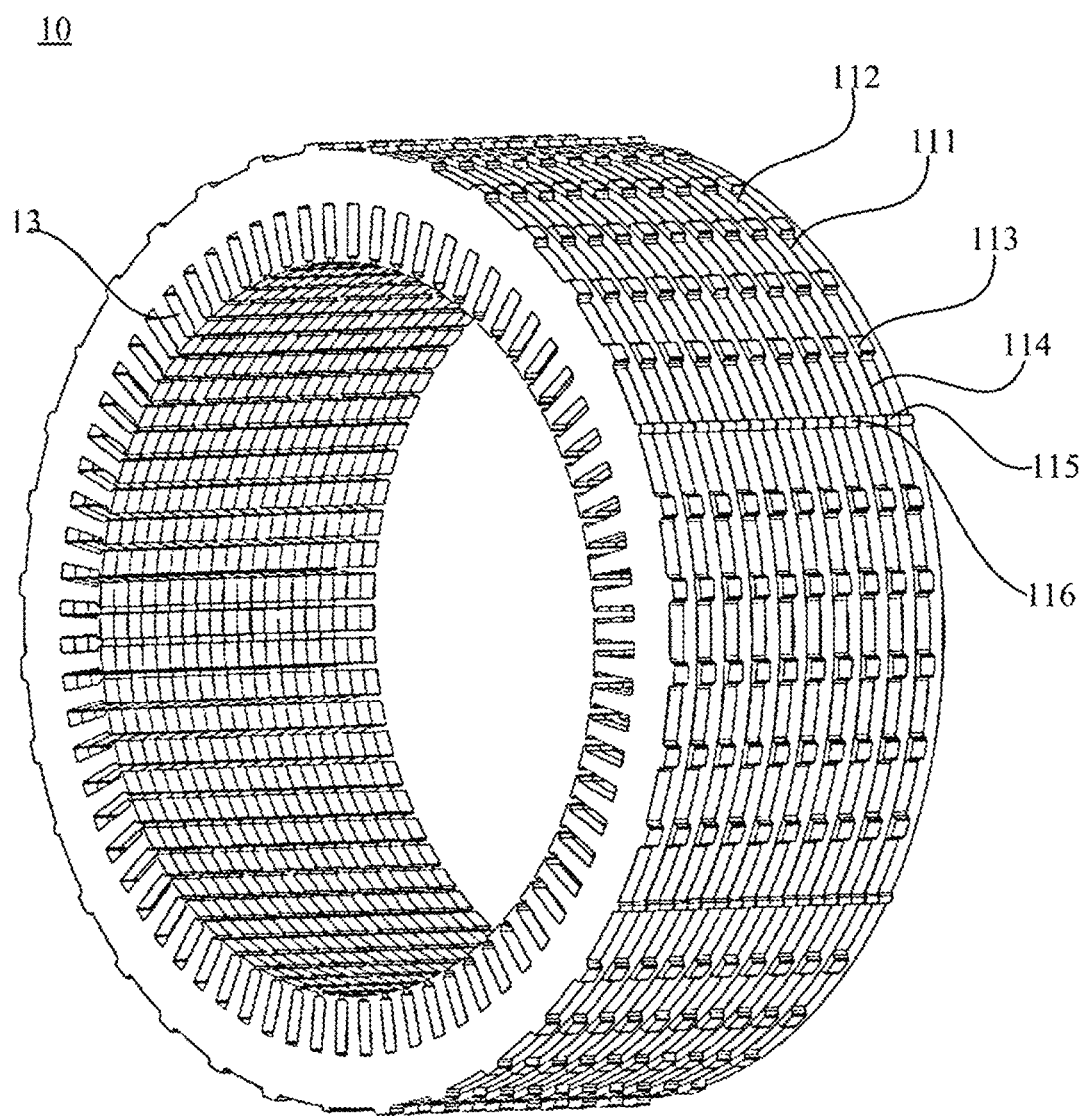
FIG. 18 is a schematic structural diagram of a stator core of a motor according to another embodiment of the present application.
Figure 19:
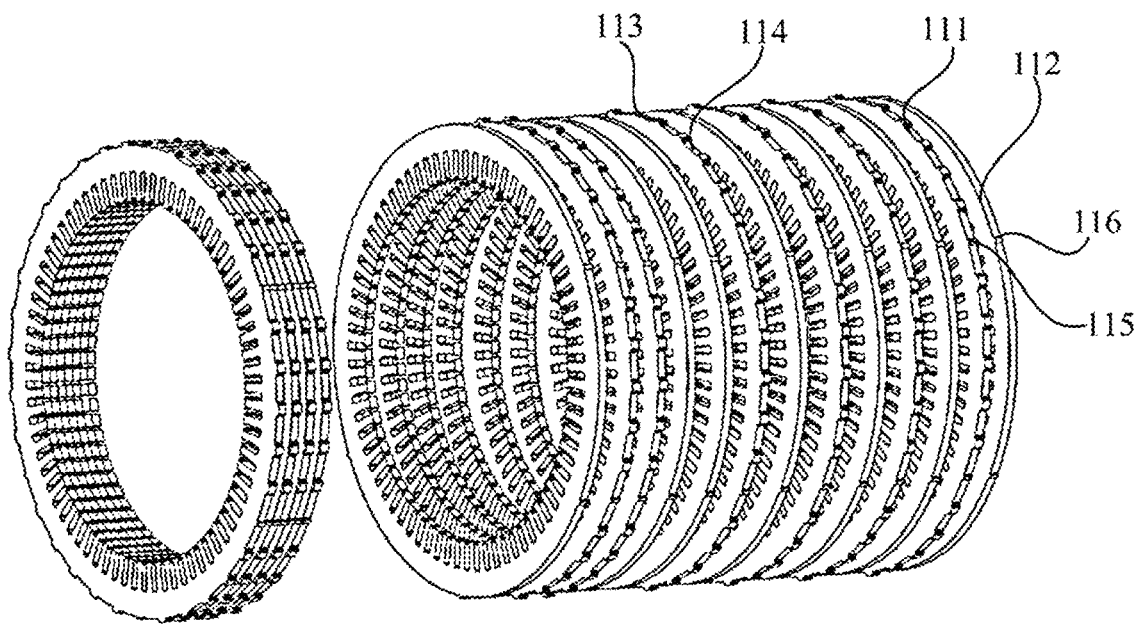
FIG. 19 is a schematic exploded view of a stator core of a motor according to another embodiment of the present application.

In an exemplary embodiment, the stator core 10 may be formed by mutually staggeredly stacking at least one annular first core punching sheet 111 and at least one annular second core punching sheet 112, as shown in FIG. 18 and FIG. 19. The housing 20 is wrapped around an outer periphery of the stator core 10, and forms a flow channel with the outer periphery of the stator core 10 by mutually attachment, so that liquid flows in the flow channel. Structures of the first core punching sheet 111 and the second core punching sheet 112 at the outer peripheral surfaces are different, such that the flow channel extends across the outer periphery of the first core punching sheet 111 and the second core punching sheet 112, thereby enabling the liquid to flow in series between the first core punching sheet 111 and the second core punching sheet 112 (i.e., the flow channels form the network-shaped cooling flow channel in the aforementioned embodiments).

The motor 100 in this embodiment includes a stator core 10 and a housing 20, wherein the stator core 10 is formed by mutually staggeredly stacking a first core punching sheet 111 and a second core punching sheet 112, such that liquid may flow in series in the flow channel formed between the first core punching sheet 111 and the second core punching sheet 112 and the housing 20, so that the cooling liquid may carry away heat of the stator core 10 to achieve the purpose of cooling. Since the flow channel in this embodiment extends across the first core punching sheet 111 and the second core punching sheet 112, the motor 100 of this embodiment has strong heat dissipation capability.

Since the flow channel in this embodiment is directly formed between the outer surface of the stator core 10 and the housing, the heat exchange area is greatly increased.

Figure 20:
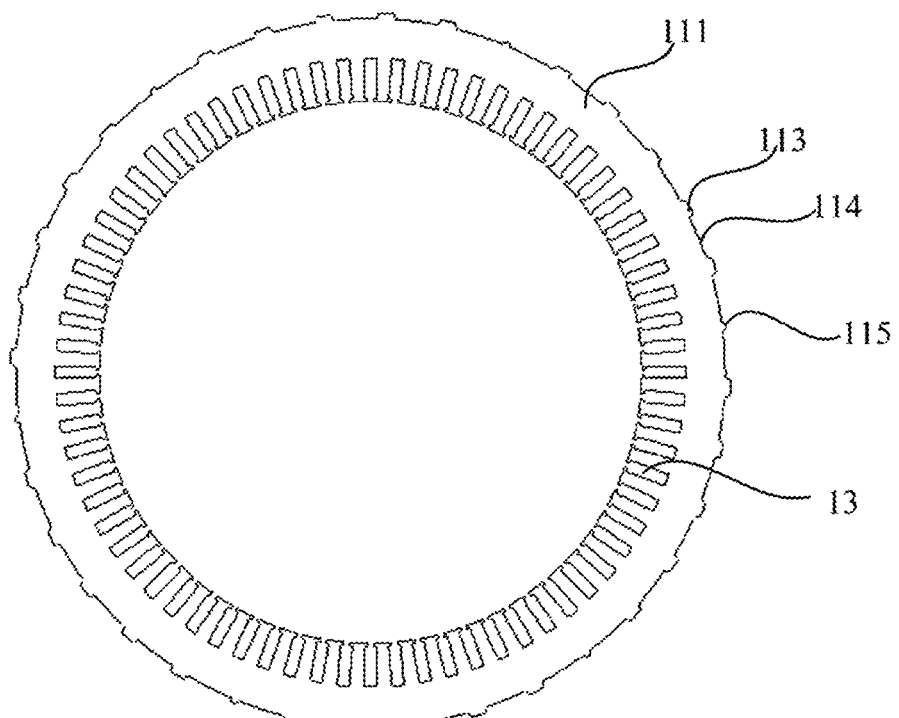
FIG. 20 is a schematic front view of a first core punching sheet according to another embodiment of the present application.
Figure 21:
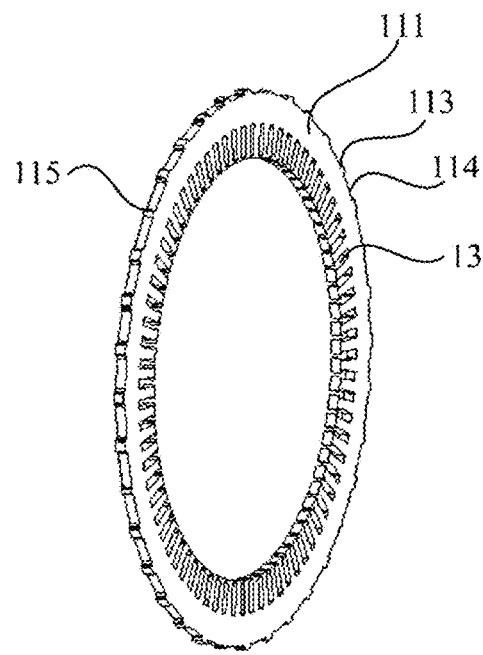
FIG. 21 is a schematic perspective view of a first core punching sheet according to another embodiment of the present application.
Figure 22:
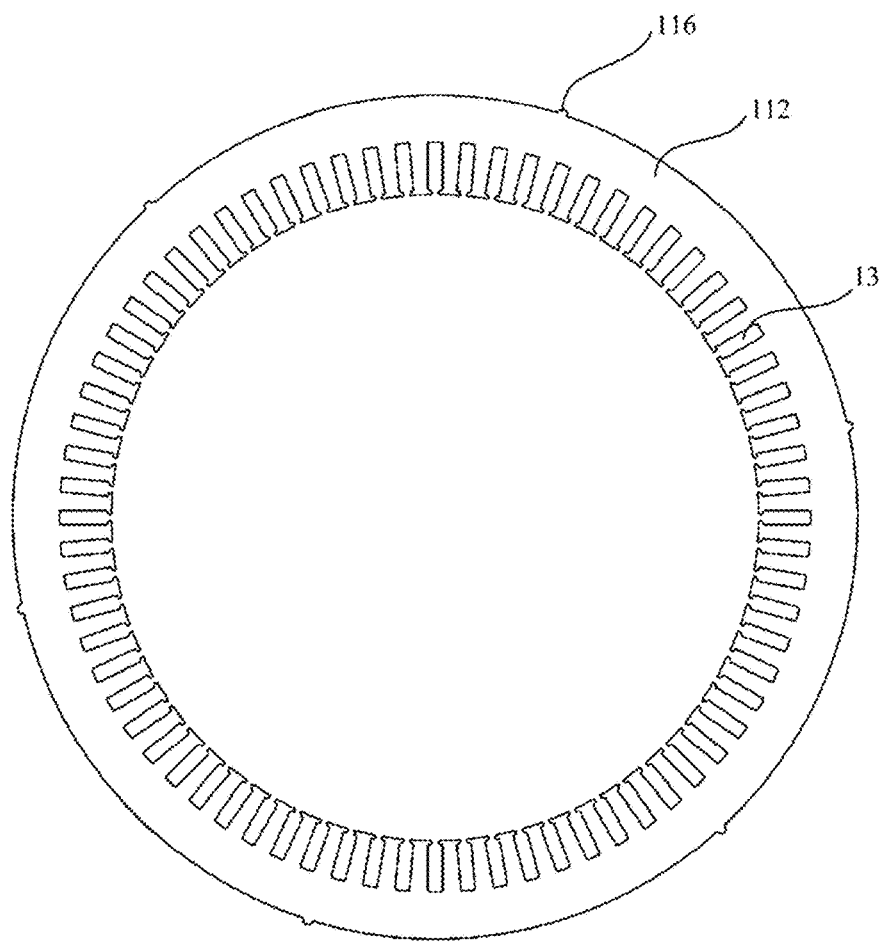
FIG. 22 is a schematic front view of a second core punching sheet according to another embodiment of the present application.
Figure 23:
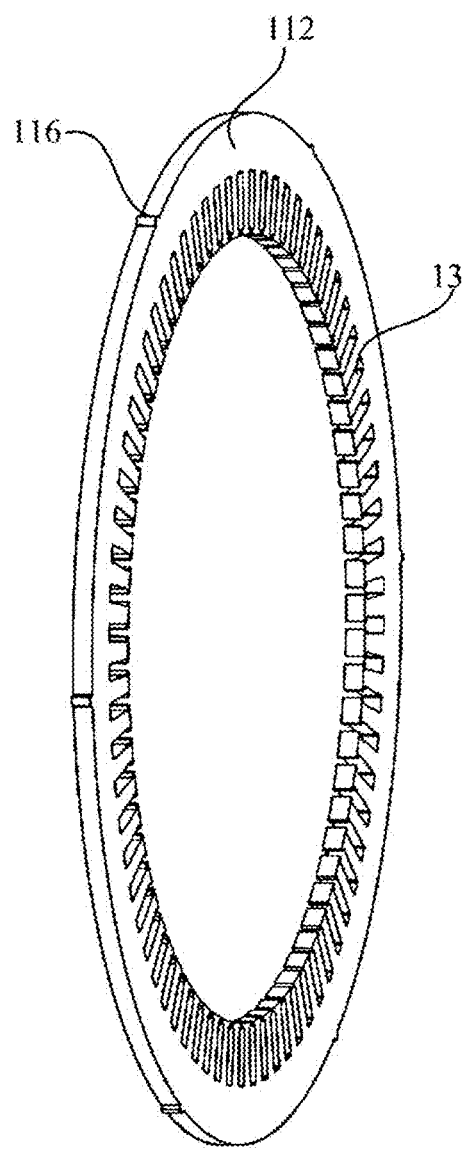
FIG. 23 is a schematic perspective view of a second core punching sheet according to another embodiment of the present application.

In an exemplary embodiment, as shown in FIG. 20 and FIG. 21, multiple convex parts 113 and multiple concave parts 114 arranged at intervals are distributed at the outer peripheral surface of the first core punching sheet 111 of this embodiment. The outer peripheral surface of the second core punching sheet 112 has a smooth structure (as shown in FIG. 22 and FIG. 23). The flow channel is formed by the concave parts 114 of the first core punching sheet 111 and the outer periphery of the second core punching sheet 112 and the inner wall of the housing 20.

Structures of the convex parts 113 and the concave parts 114 at the outer periphery of the first core punching sheet 111 of this embodiment may be freely designed according to actual needs. For example, the convex parts 113 in this embodiment have a cubic shape. In other embodiments, a structure of the convex parts 113 may be a stepped terrace or another three-dimensional structure. The structure of the convex parts 113 only needs to be platform-shaped at the outermost part. The outermost parts of the convex parts 113 of the first core punching sheet 111 are all in contact with the inner wall of the housing 20. The structure design of the outer periphery of the first core punching sheet 111 in this embodiment can greatly increase the heat exchange area, thereby improving the heat exchange effect.

In addition, the structure of the outer periphery of the second core punching sheet 112 in this embodiment may be other structures other than a smooth structure, only if a structure height at the outer periphery of the second core punching sheet 112 does not exceed a height of the convex parts 113 of the first core punching sheet 111, and a communicated flow channel may be formed between the second core punching sheet 112 and the concave parts 114 and the housing 20. In a case that the outer periphery of the second core punching sheet 112 is designed as other structures, the structure of the second core punching sheet 112 is different from that of the first core punching sheet 111. The outer periphery of the second core punching sheet 112 is designed to have other structure instead of a smooth structure, such that the heat exchange area can be increased and the heat exchange efficiency of the motor 100 can be improved.

In an exemplary embodiment, a thickness of the first core punching sheet 111 and a thickness of the second core punching sheet 112 may be freely designed according to actual needs.

In an exemplary embodiment, in a case that the first core punching sheet 111 and the second core punching sheet 112 are mutually stacked at intervals, the outer peripheral surface of the second core punching sheet 112 is flush with the concave parts 114. That is, the concave parts 114 of the first core punching sheet 111 and the outer periphery of the second core punching sheet 112 are on a same smooth plane, so that the cooling liquid can flow smoothly in series between the first core punching sheet 111 and the second core punching sheet 112, thereby improving the cooling efficiency.

In an exemplary embodiment, a first protrusion 115 is further provided at a concave part 114 of the outer peripheral surface of the first core punching sheet 111, as shown in FIG. 20 and FIG. 21, wherein the first protrusion 115 extends in a direction in which the axial direction of the first core punching sheet 111 is located. A second protrusion 116 is provided at the outer peripheral surface of the second core punching sheet 112, as shown in FIG. 22 and FIG. 23, wherein the second protrusion 116 extends in the axial direction of the second core punching sheet 112. Herein, the first protrusion 115 and the second protrusion 116 are mated when the first core punching sheet 111 and the second core punching sheet 112 are mutually stacked at intervals. In this embodiment, the first protrusion 115 and the second protrusion 116 are designed to enable accurate positioning when the first core punching sheet 111 and the second core punching sheet 112 are mutually stacked.

Figure 24:
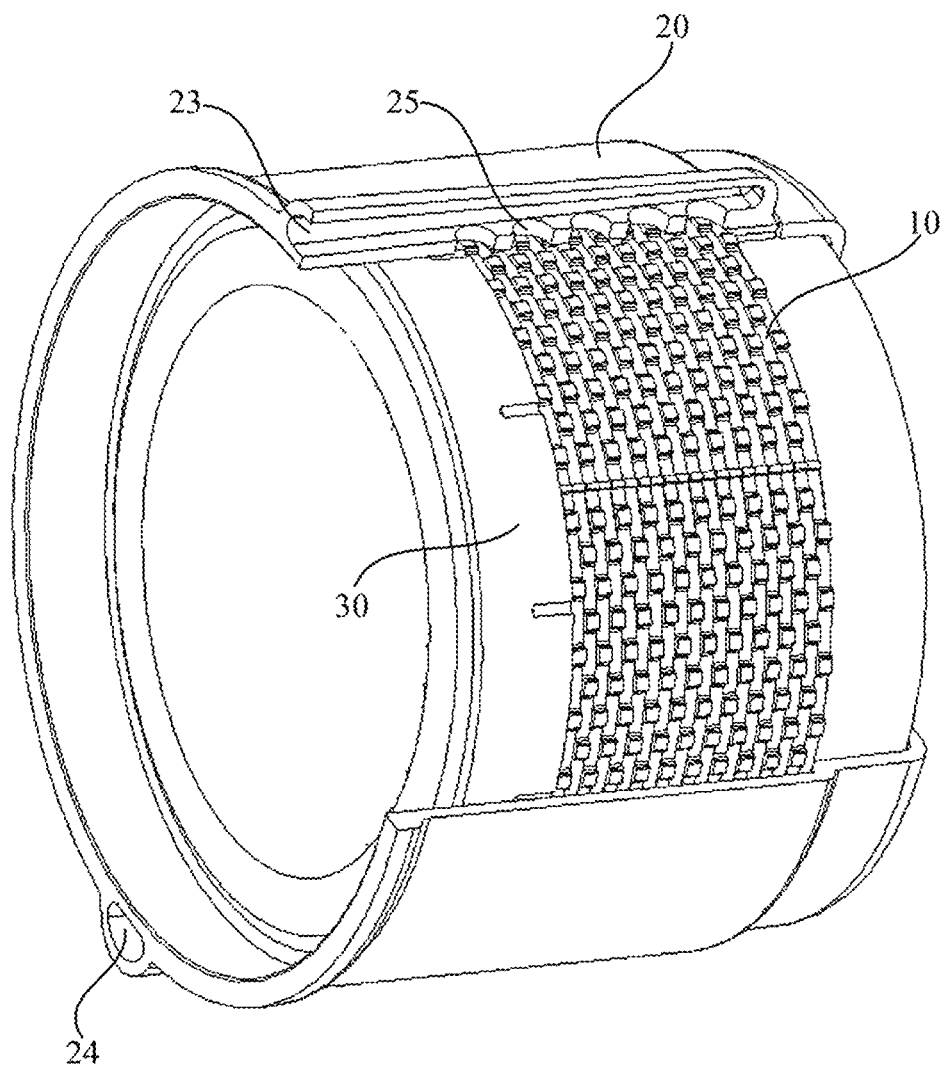
FIG. 24 is a schematic structural diagram of a motor according to another embodiment of the present application.
Figure 25:
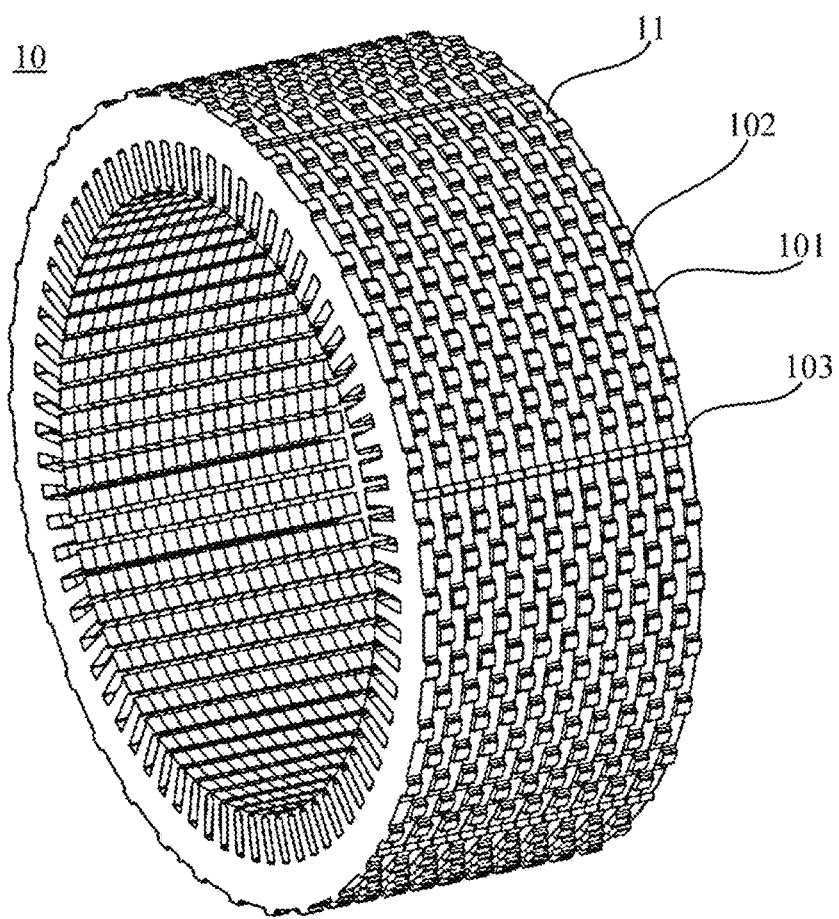
FIG. 25 is a schematic structural diagram of a stator core of a motor according to another embodiment of the present application.
Figure 26:
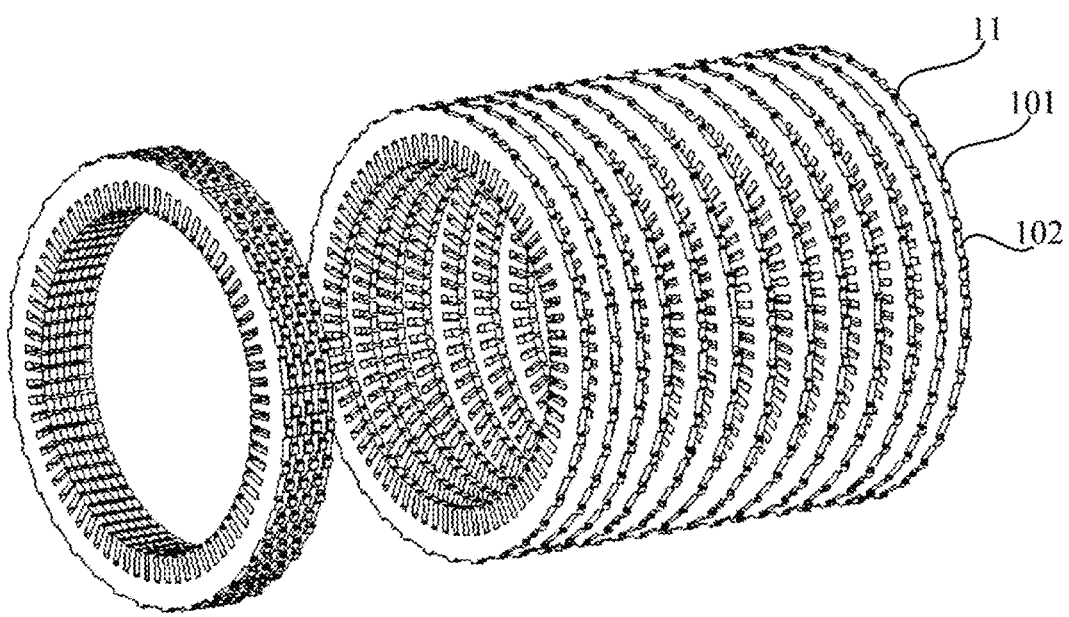
FIG. 26 is a schematic exploded view of a stator core of a motor according to another embodiment of the present application.

FIG. 24 to FIG. 27 are schematic structural diagrams of a motor and components thereof according to another embodiment of the present application. As shown in FIG. 24, the motor 100 of this embodiment may include a stator core 10 and a housing 20 (i.e., the casing in the foregoing embodiments), and further, the stator core 10 is formed by mutually stacking multiple core punching sheets 11, as shown in FIG. 25 and FIG. 26. Multiple convex parts 101 and multiple concave parts 102 are provided on an outer periphery of the core punching sheets 11 in this embodiment. The housing 20 is wrapped around an outer periphery of the stator core 10, and forms a flow channel (i.e., the slit flow channel in the aforementioned embodiments) with the convex parts 101 of the stator core 10 by mutually attachment. Herein, in a case that a circumferential dimension of a convex part 101 is smaller than a circumferential dimension of a concave part 102, and the core punching sheets 11 are mutually staggeredly stacked, the convex parts 101 and the concave part 102 of two adjacent core punching sheets 11 are staggeredly arranged so that liquid can flow in series within multiple core punching sheets 11.

In this embodiment, the multiple core punching sheets 11 have same structures, however, since dimension of a convex part 101 is smaller than that of a concave part 102. Therefore, in a case that different core punching sheets 11 are attached in an mutually staggeredly and the convex parts 101 and the concave parts 102 are staggeredly arranged, the flow channel is mainly composed of the concave parts 102 and the housing 20, and the convex parts 101 are interspersed in the flow channel, so that liquid may mutually flow in series (i.e., the flow channel forms the network-shaped cooling flow channel in the aforementioned embodiments), and the cooling effect of the stator core 10 is improved.

The core punching sheet 11 in this embodiment may have the same structure as the first core punching sheet 111 in the aforementioned embodiment. Apparently, it may be designed into different shapes as required.

In an exemplary embodiment, a structure of each concave part 101 of this embodiment may be cubic in shape. In other embodiments, the structure of a convex part 101 may be a stepped terrace or another three-dimensional structure. The structure of the convex part 101 only needs to be platform-shaped at the outermost part. The outermost parts of the convex parts 101 of the core punching sheet 11 are all in contact with the inner wall of the housing 20. Since all the core punching sheets 11 in this embodiment include structures of the convex part 101, and the structures of the convex parts 101 are all in contact with the housing 20, the core punching sheet 11 is subjected to a force around the housing 20, thereby preventing the core punching sheet 11 from being deformed.

Figure 27:
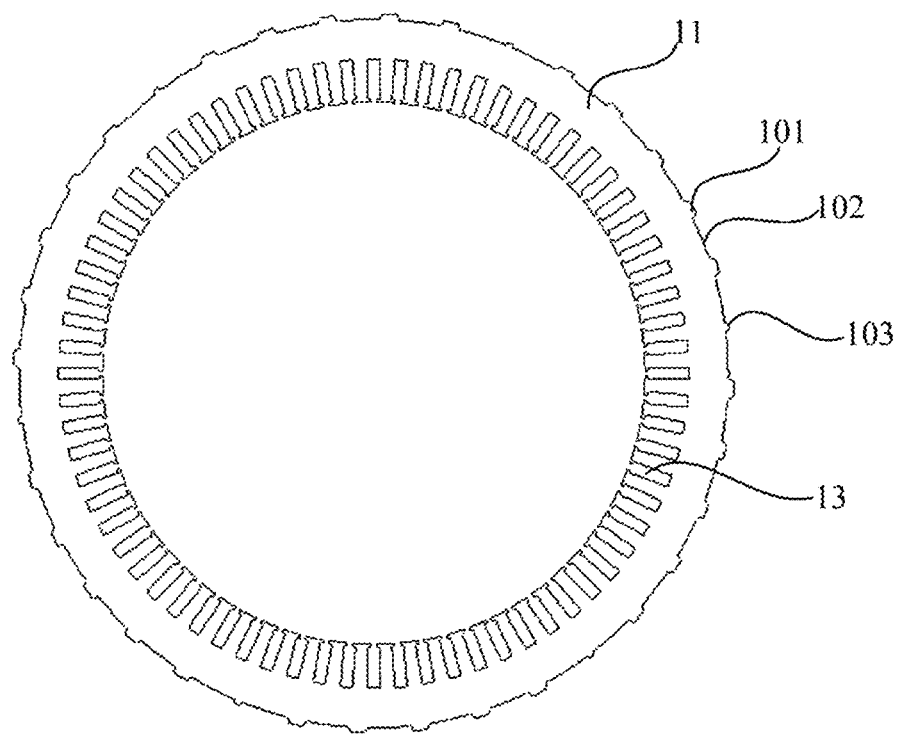
FIG. 27 is a schematic front view of a stator core according to another embodiment of the present application.

In the example of this embodiment, a protrusion 103 is provided at the core punching sheet 11, as shown in FIG. 25 and FIG. 27. The protrusion 103 extends along the axial direction of the core punching sheet 11. In a case that multiple core punching sheets 11 are stacked to form a stator core 10, the protrusions 103 at the multiple core punching sheets 11 are connected with each other to form a line.

In this embodiment, in a case that two adjacent core punching sheets 11 are staggeredly provided, a convex part 101 of one core punching sheet 11 may be provided on a side of a middle position of a concave part 102 of another core punching sheet 11, and the flow channel formed in this case is relatively regular.

The thickness of the core punching sheet 11 and the number and dimension of the convex parts 101 and the concave parts 102 in this embodiment may be designed as required. A larger number of convex parts 101 and concave parts 102 and a larger number of flow channels will bring a better cooling effect.

In an exemplary embodiment, an inner periphery of each core punching sheet 11 is provided with winding grooves 13 (i.e., the cogging grooves in the aforementioned embodiments), and a large number of windings are provided in the winding grooves 13, so that the design of the protrusions 103 can make the winding grooves 13 remain aligned when different core punching sheets 11 are mutually stacked.

Figure 28:
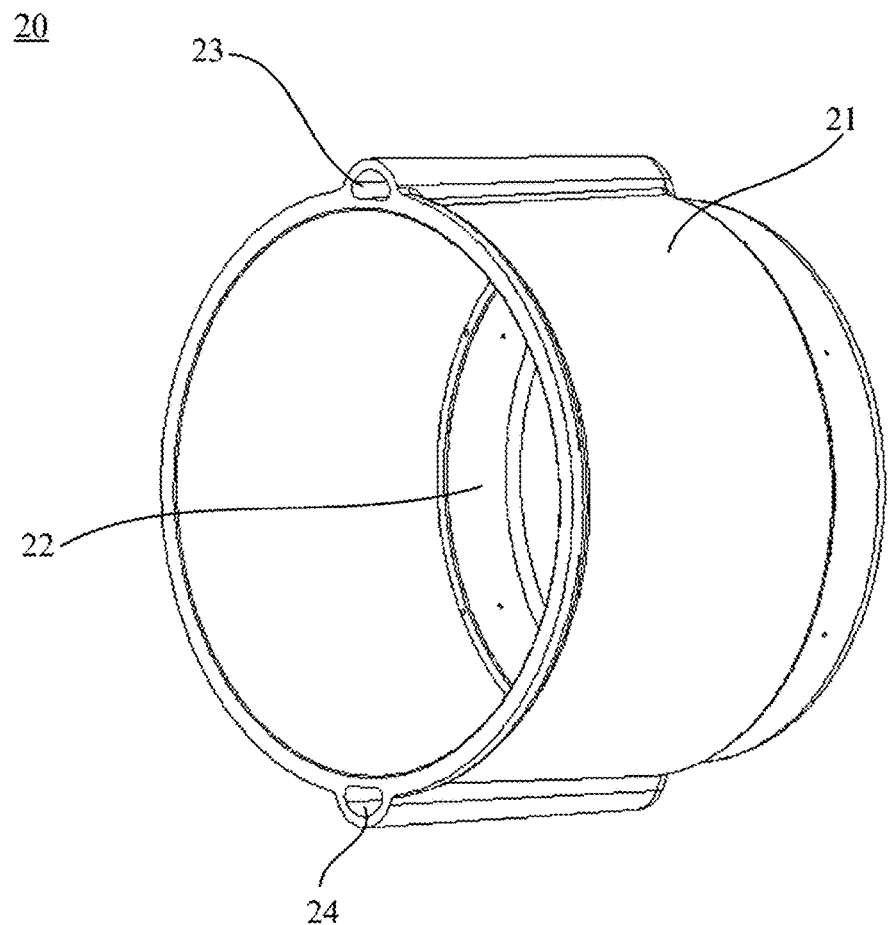
FIG. 28 is a schematic structural diagram of a housing according to an embodiment of the present application.

In an exemplary embodiment, FIG. 28 is a schematic structural diagram of a housing according to an embodiment of the present application. In the above two embodiments (the motors illustrated in FIG. 17 to FIG. 23 and the motors illustrated in FIG. 24 to FIG. 27), different stator cores 10 may be equipped with the same housing 20. As shown in FIG. 28, the housing 20 in this embodiment includes a body 21, wherein the body 21 has a cylindrical shape, and a step 22 with a smaller size than other positions is provided at one end of the cylindrical shape. In a case that the stator core 10 is provided in the housing 20, the outer periphery of the stator core 10 is attached to the inner wall of the housing 20, and one end of the stator core 10 abuts against the step 22.

In an exemplary embodiment, as shown in FIG. 28, a liquid inflow channel 23 (i.e. the input channel in the foregoing embodiments) and a liquid outflow channel 24 (i.e. the output channel in the foregoing embodiments) are further included at the housing 20. In a case that the housing 20 and the stator core 10 are fixedly disposed, the liquid inflow channel 23 and the liquid outflow channel 24 are communicated with the flow channel, and the liquid flows in the liquid inflow channel 23 passes through the flow channel and then flows out from the liquid outflow channel 24.

As shown in FIG. 28, the liquid inflow channel 23 and the liquid outflow channel 24 may be provided outside the housing 20, and the wall of the housing 20 is a portion of each of the liquid inflow channel 23 and the liquid outflow channel 24, and the housing 20 are provided with through holes 25 (i.e. the input hole and the first output hole in the foregoing embodiment) at the liquid inflow channel 23 and the liquid outflow channel 24. In this embodiment, the through holes 25 of the liquid inflow channel 23 (i.e. the input holes in the foregoing embodiments) is plural and the multiple through holes 25 may be arranged in juxtaposition. Similarly, the through holes 25 at the liquid outflow channel 24 (i.e. the first output holes in the aforementioned embodiments) is also plural and the multiple through holes 25 may be arranged in juxtaposition.

Cross sections of the liquid inflow channel 23 and the liquid outflow channel 24 of this embodiment may be any shape, for example, semicircular, rectangular, or the like.

A shape of a through hole 25 in this embodiment may be any shape, for example, round, square, diamond, or the like. The cooling liquid entering the liquid inflow channel 23 first enters the flow channel through the through hole 25 at the liquid inflow channel 23, then flows through the liquid outflow channel 24 via the through hole 25 at the liquid outflow channel 24 and then flows out.

The liquid inflow channel 23 and the liquid outflow channel 24 may extend along the axial direction of the stator core 10, and the liquid inflow channel 23 and the liquid outflow channel 24 are located at opposite positions at the outer periphery of the stator core 10, respectively. This position design can increase the heat dissipation capacity of the motor 100.

Figure 29:
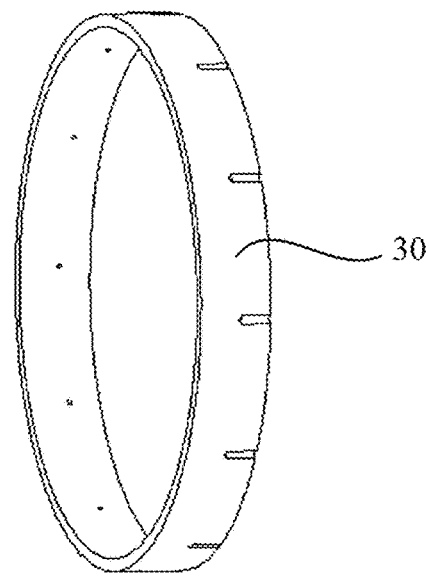
FIG. 29 is a schematic structural diagram of an oil slinger according to an embodiment of the present application.

FIG. 29 is a schematic structural diagram of an oil slinger according to an embodiment of the present application. The motor 100 of this embodiment may further include an oil slinger 30 provided in the housing 20 at an end of the stator core 10 opposite to the end abutting against the step 22, as shown in FIG. 29, and the step 22, the concave parts 102, the inner wall of the housing 20 and the oil slinger 30 together form a sealed flow channel.

An embodiment of the present application further provides a vehicle (not shown in figures) including the aforementioned motor 100.

In the description of embodiments of the present application, it is to be understood that, the terms "center", "longitudinal", "transverse", "length", "width", "thickness", "up", "down", "front", "rear", "left", "right", "vertical", "horizontal", "top", "bottom", "inner", "outer", "clockwise", "counterclockwise", "axial", "radial", "circumferential", etc. indicate orientation or positional relationships based on the orientation or positional relationships shown in drawings. They are intended for ease of description of the embodiments of the present application and for simplified description only, and are not intended to indicate or imply that the referred device or element must have a particular orientation, be constructed and operate in a particular orientation, and therefore cannot be construed as limitations on the present application.

Furthermore, the terms "first" and "second" are used for purposes of description only and cannot be understood as indicating or implying relative importance or implying the number of technical features indicated. Thus, the features defined with "first", "second" may explicitly or implicitly include at least one of the features. In the description of embodiments of the present application, "a plurality" means at least two, e.g. two, three, etc. unless otherwise explicitly and specifically defined.

In the description of the embodiments of the present application, unless otherwise specified and defined, the terms "mount", "connected with", "connection", "fixed" should be understood in a broad sense, for example, a connection may be a fixed connection, a detachable connection or an integrated connection, it may be a mechanical connection, or an electrical connection, it may be a direct connection, or an indirect connection through an intermediary, or may be an internal communication between two elements or an interaction relationship between two elements unless otherwise explicitly defined. For those of ordinary skills in the art, the specific meanings of the above terms in the embodiments of the present application can be understood according to specific situations.

In embodiments of the present application, the first feature being "above" or "below" the second feature may be a direct contact between the first feature and second feature, or an indirect contact between the first feature and second feature via an intermediary, unless otherwise explicitly specified and defined. Moreover, the first feature is "above" the second feature may be that the first feature is directly above or obliquely above the second feature, or simply indicate that a horizontal height of the first feature is higher than that of the second feature. The first feature being "below" the second feature may be that the first feature is directly below or obliquely below the second feature, or simply indicate the horizontal height of first feature is small than that of the second feature.

In the description of this specification, descriptions of the reference terms "an embodiment," "some embodiments," "example," "specific example," or "some examples," and the like mean that specific features, structures, materials, or characteristics described in combination with the embodiment or example are included in at least an embodiment or example of the present application. In this specification, the schematic demonstration of the above terms need not be directed to the same embodiments or examples. In addition, the specific features, structures, materials, or characteristics described may be combined in a suitable manner in any one or more embodiments or examples. Besides, without mutual confliction, those skilled in the art may be in combination and conjunction with different embodiments or examples described in this specification and features of different embodiments or examples.

Although the embodiments of the present application have been shown and described above, it is to be understood that the aforementioned embodiments are exemplary and cannot be construed as limit to the present application, and change, modification, substitution and variation may be made to the aforementioned embodiments by those of ordinary skilled in the art within the scope of the present application.

The invention claimed is:

1. A motor comprising:
a casing;
a stator core fixed in the casing, wherein a slit flow channel is formed between an outer side wall of the stator core and an inner side wall of the casing, and the slit flow channel is provided as a network-shaped cooling flow channel for a cooling fluid to flow;
a stator winding mounted on the stator core;
and a rotor rotatably sleeved on an inner side of the stator core, wherein the stator core comprises a plurality of core assemblies mutually stacked along an axial direction of the stator core; on an outer peripheral surface of each of the core assemblies that forms the outer side wall of the stator core, each of the core assemblies is provided with a plurality of heat dissipation protrusions spaced apart along a circumferential direction of the core assembly, and the heat dissipation protrusions of adjacent core assemblies are staggeredly arranged along a circumferential direction of the stator core, to form the network-shaped cooling flow channel; number and distribution form of the heat dissipation protrusions on the plurality of the core assemblies are same, each of the core assemblies is provided with a plurality of heat dissipation groups, and each of the heat dissipation groups comprises at least one of the heat dissipation protrusions;
on each of the core assemblies, a circumferential spacing between adjacent heat dissipation groups is larger than a circumferential spacing between adjacent heat dissipation protrusions in each heat dissipation group; and
the circumferential spacing between adjacent heat dissipation groups on each of the plurality of core assemblies have identical alignment with the heat dissipation group on an adjacent core assembly, and a length of the circumferential spacing between the adjacent heat dissipation groups on each of the plurality of core assemblies is larger than a length of the heat dissipation group on the adjacent core assembly in the circumferential direction.

2. The motor according to claim 1, wherein
the inner side wall of the casing is provided with a plurality of heat dissipation protrusions; the plurality of heat dissipation protrusions are staggeredly arranged in a network-shaped form, so that the slit flow channel is divided into the network-shaped cooling flow channel.

3. The motor according to claim 2, wherein
the casing is further provided with an input channel and at least one input hole communicated with the input channel, wherein the input channel is located radially outward of the network-shaped cooling flow channel and is communicated with the network-shaped cooling flow channel through the at least one input hole for inputting the cooling fluid into the network-shaped cooling flow channel;
the casing is further provided with an output channel and at least one first output hole communicated with the output channel, wherein the output channel is located radially outward of the network-shaped cooling flow channel and is communicated with the network-shaped cooling flow channel through the at least one first output hole for outputting the cooling fluid discharged from the network-shaped cooling flow channel.

4. The motor according to claim 1, wherein
at least part of the heat dissipation protrusions on the outer side wall of the stator core abut against the inner side wall of the casing, so that the stator core and the casing are in interference fit.

5. The motor according to claim 1, wherein
the core assembly is formed by stacking a plurality of stator punching sheets, each stator punching sheet is provided with a plurality of heat dissipation teeth, and the heat dissipation teeth corresponding to the plurality of stator punching sheets are stacked to form the heat dissipation protrusions.

6. The motor according to claim 1, wherein
the stator core is provided with a plurality of cogging grooves for mounting the stator winding along the circumferential direction of the stator core, and the number of the cogging grooves is an integer multiple of the number of the heat dissipation groups of each core assembly.

7. The motor according to claim 6, wherein
each of the heat dissipation groups comprises a plurality of heat dissipation posts provided at intervals along the circumferential direction of the core assembly;
in each of the heat dissipation groups, one of the heat dissipation protrusions is provided as a positioning protrusion, the positioning protrusion has a shape different from shapes of other heat dissipation protrusions.

8. The motor according to claim 1, wherein
two end portions of the stator winding protruding from the stator core are defined as end windings;
the casing is provided with an open end, and the motor further comprises an end cap provided at the open end, wherein the end cap is provided with a first heat dissipation groove, and the first heat dissipation groove is communicated with the network-shaped cooling flow channel; a bottom wall of the first heat dissipation groove corresponding to an end winding is provided with a first waterfall-spray slit for spraying the cooling fluid to the end winding corresponding to the first waterfall-spray slit;
the end cap is further provided with a second output hole, and the second output hole is configured to be communicated with an external cooling flow path for discharging the cooling fluid flowing through the end winding corresponding to the first waterfall-spray slit into the external cooling flow path.

9. The motor according to claim 8, wherein the number of the open end is one, and the motor further comprises a waterfall-spray heat dissipation ring sleeved in the casing and located at one end of the casing away from the open end;
the waterfall-spray heat dissipation ring is provided with a second heat dissipation groove communicated with the network-shaped cooling flow channel; a bottom wall of the second heat dissipation groove corresponding to an end winding is provided with a second waterfall-spray slit for spraying the cooling fluid to the end winding corresponding to the second heat dissipation groove;
the casing is further provided with a third output hole configured to be communicated with the external cooling flow path for discharging the cooling fluid flowing through the end winding corresponding to the second waterfall-spray slit into the external cooling flow path.

10. The motor according to claim 9, wherein
the number of the first waterfall-spray slit is one, and the first waterfall-spray slit is provided at a top of the end cap and extends along a circumferential direction of the end cap, and a radian of the first waterfall-spray slit is in a range of 40° to 180°; or, a plurality of first waterfall-spray slits are provided, and the plurality of first waterfall-spray slits are provided at intervals along the circumferential direction of the end cap; or, the number of the first waterfall-spray slit is one, and the first waterfall-spray slit surrounds the end cap along the circumferential direction of the end cap; and
the number of the second waterfall-spray slit is one, the second waterfall-spray slit is provided at a top of the waterfall-spray heat dissipation ring and extends along a circumferential direction of the waterfall-spray heat dissipation ring, and a radian of the second waterfall-spray slit is in the range of 40° to 180°; or, a plurality of second waterfall-spray slits are provided, and the plurality of second waterfall-spray slits are provided at intervals along the circumferential direction of the waterfall-spray heat dissipation ring; or, the number of the second waterfall-spray slit is one, and the second waterfall-spray slit surrounds the waterfall-spray heat dissipation ring along the circumferential direction of the waterfall-spray heat dissipation ring.

11. A power assembly comprising the motor according to claim 1.

12. An automobile comprising the power assembly according to claim 11.

13. A stator core, wherein
the stator core comprises a plurality of core assemblies mutually stacked along an axial direction of the stator core; on an outer peripheral surface of each of the core assemblies that forms an outer side wall of the stator core, each of the core assemblies is provided with a plurality of heat dissipation protrusions spaced apart along a circumferential direction of the core assembly, and the heat dissipation protrusions of adjacent core assemblies are staggeredly arranged along a circumferential direction of the stator core, to form a slit flow channel in a network shape;
number and distribution form of the heat dissipation protrusions on the plurality of the core assemblies are same, each of the core assemblies is provided with a plurality of heat dissipation groups, and each of the heat dissipation groups comprises at least one of the heat dissipation protrusions; and
on each of the core assemblies, a circumferential spacing between adjacent heat dissipation groups is larger than a circumferential spacing between adjacent heat dissipation protrusions in each heat dissipation group; and
the circumferential spacing between adjacent heat dissipation groups on each of the plurality of core assemblies have identical alignment with the heat dissipation group on an adjacent core assembly, and a length of the circumferential spacing between the adjacent heat dissipation groups on each of the plurality of core assemblies is larger than a length of the heat dissipation group on the adjacent core assembly in the circumferential direction.

14. A motor comprising:
a stator core and a housing;
the stator core is formed by mutually stacking a plurality of annular core punching sheets;
wherein the core punching sheets comprise a first core punching sheet, a second core punching sheet, and a third core punching sheet, and the stator core is formed by mutually staggeredly stacking the first core punching sheet, the second core punching sheet and the third core punching sheet, the second core punching sheet is arranged between the first core punching sheet and the third core punching sheet; the housing is wrapped around an outer periphery of the stator core, and the housing and the outer periphery of the stator core are mutually fitted to form a flow channel;
the outer peripheral surface of the second core punching sheet has a smooth structure;
each of the first core punching sheet and the third core punching sheet is provided with a plurality of heat dissipation protrusions spaced apart along a circumferential direction of the core punching sheet;
number and distribution form of the heat dissipation protrusions on the first core punching sheet is the same as number and distribution form of the heat dissipation protrusions on the third core punching sheet, each of the first core punching sheet and the third core punching sheet is provided with a plurality of heat dissipation groups, and each of the heat dissipation groups comprises at least one of the heat dissipation protrusions;
on each of the first core punching sheet and the third core punching sheet, a circumferential spacing between adjacent heat dissipation groups is larger than a circumferential spacing between adjacent heat dissipation protrusions in each heat dissipation group; and the circumferential spacing between adjacent heat dissipation groups on the first core punching sheet have identical alignment with the heat dissipation group on the third core punching sheet, and a length of the circumferential spacing between the adjacent heat dissipation groups on the first core punching sheet is larger than a length of the heat dissipation group on the third core punching sheet in the circumferential direction.

15. A vehicle comprising the motor according to claim 14.

* * * * *